US010659202B2

(12) United States Patent
Yamamoto et al.

(10) Patent No.: US 10,659,202 B2
(45) Date of Patent: May 19, 2020

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/746,742

(22) PCT Filed: Jul. 14, 2016

(86) PCT No.: PCT/JP2016/003324
§ 371 (c)(1),
(2) Date: Jan. 22, 2018

(87) PCT Pub. No.: WO2017/026091
PCT Pub. Date: Feb. 16, 2017

(65) Prior Publication Data
US 2018/0205513 A1    Jul. 19, 2018

(30) Foreign Application Priority Data

Aug. 11, 2015    (JP) ................. 2015-159141

(51) Int. Cl.
*H04L 5/00*    (2006.01)
*H04L 1/08*    (2006.01)
(Continued)

(52) U.S. Cl.
CPC ............. *H04L 5/0044* (2013.01); *H04L 1/08* (2013.01); *H04L 1/1861* (2013.01);
(Continued)

(58) Field of Classification Search
CPC ... H04L 5/0044; H04L 5/0055; H04L 5/0007; H04L 1/1861; H04L 5/0048; H04W 72/0446; H04W 72/042; H04W 4/70
See application file for complete search history.

(56) References Cited

U.S. PATENT DOCUMENTS

2017/0353272 A1* 12/2017 Takeda ..................... H04L 1/16

OTHER PUBLICATIONS

International Search Report of PCT application No. PCT/JP2016/003324 dated Sep. 20, 2016.
(Continued)

*Primary Examiner* — Jae Y Lee
(74) *Attorney, Agent, or Firm* — Seed IP Law Group LLP

(57) ABSTRACT

A receiver (202) receives the same downlink data over one or more subframes through a downlink resource within a narrow band for MTC terminal. A response signal generator (210) generates a response signal as a response to the downlink data. A transmitter (217) transmits the response signal through an uplink resource a predetermined number of subframes after the last subframe of the one or more subframes, the uplink resource being associated in one-to-one correspondence with the number of a downlink resource to which the downlink data is allocated in the last subframe.

7 Claims, 12 Drawing Sheets

(51) Int. Cl.
 H04L 1/18 (2006.01)
 H04W 72/04 (2009.01)
 H04W 4/70 (2018.01)
(52) U.S. Cl.
 CPC .......... H04L 5/0007 (2013.01); H04L 5/0055 (2013.01); H04W 72/0446 (2013.01); *H04L 1/1858* (2013.01); *H04L 1/1864* (2013.01); *H04L 5/0048* (2013.01); *H04W 4/70* (2018.02); *H04W 72/042* (2013.01)

(56) References Cited

OTHER PUBLICATIONS

3GPP TS 36.211 V12.5.0, "3rd Generation Partnership Project; Technical Specification Group Radio Access Network; Evolved Universal Terrestrial Radio Access (E-UTRA); Physical channels and modulation (Release 12)", Mar. 2015.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)", Mar. 2015.
3GPP TS 36.213 V12.5.0, "3rd Generation Partnership Project; Technical Specification Group Radio Access Network; Evolved Universal Terrestrial Radio Access (E-UTRA); Physical layer procedures (Release 12)", Mar. 2015.
Seigo Nakao et al., "Performance enhancement of E-UTRA uplink control channel in fast fading environments", Proceeding of 2009 IEEE 69th Vehicular Technology Conference (VTC2009-Spring), Apr. 2009.
3GPP TSG RAN Meeting #65, RP-141660, "New WI proposal: Further LTE Physical Layer Enhancements for MTC", Sep. 2014.
MediaTek Inc., Discussion on PUCCH resource allocation for Rel-13 MTC, 3GPP TSG-RAN WG1 #81 R1-153317, May 16, 2015, Internet<URL:http://www.3gpp.org/ftp/tsg_ran/WG1_RL1/TSGR1_81/Docs/R1-153317.zip>.
LG Electronics, HARQ-ACK feedback for MTC UE, 3GPP TSG-RAN WG1 #81 R1-152704, May 16, 2015, Internet<URL:http://www.3gpp.org/ftp/tsg_ran/WG1_RL1/TSGR1_81/Docs/R1-152704.zip>.

* cited by examiner

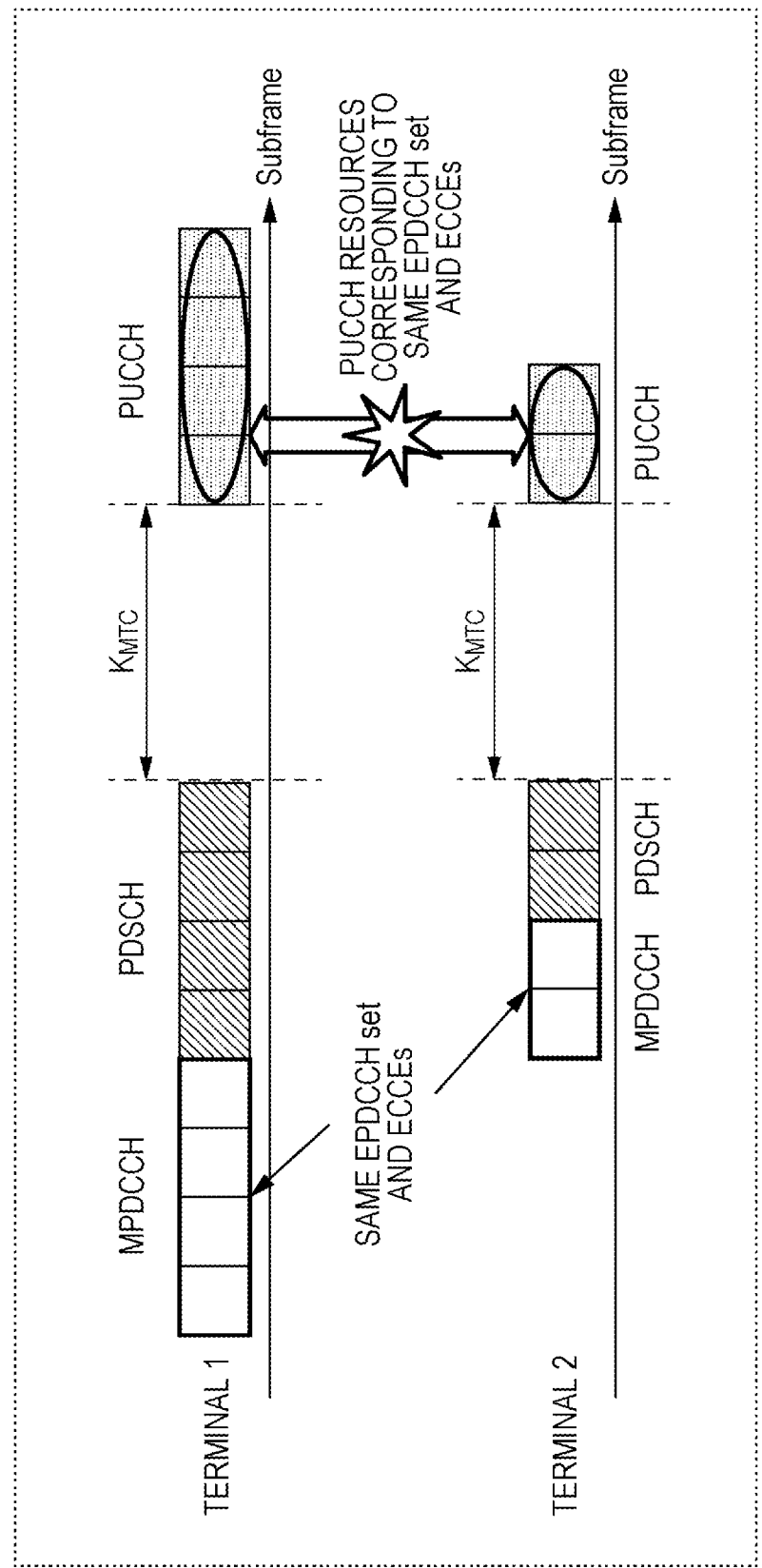

TERMINAL, BASE STATION, TRANSMISSION METHOD, AND RECEPTION METHOD

TECHNICAL FIELD

The present disclosure relates to a terminal, a base station, a transmission method, and a reception method.

BACKGROUND ART

In 3GPP LTE (3rd Generation Partnership Project Long Term Evolution), OFDMA (orthogonal frequency division multiple access) is employed as a mode of downlink communication from a base station (also called "eNB") to a terminal (also called "user equipment") and SC-FDMA (single-carrier frequency-division multiple access) is employed as a mode of uplink communication from a terminal to a base station (see, for example, NPL 1 to NPL 3).

In LTE, a base station performs communication by allocating resource blocks (RBs) within a system band to a terminal for each time unit called subframe. Further, the base station transmits, through a downlink control channel (PD-CCH: Physical Downlink Control Channel), control information according to which the terminal transmits and receives data. Further, in LTE Release 11, the base station can also transmit the control information through the EPD-CCH (Enhanced PDCCH), i.e. an enhancement of the PDCCH. The terminal decodes the control information transmitted thereto by the received PDCCH signal or EPD-CCH signal and obtains information pertaining to frequency allocation or adaptive control that is needed for the transmission and reception of data.

Further, in LTE, HARQ (hybrid automatic repeat request) is applied to downlink data. That is, the terminal feeds back, to the base station, a response signal representing a result of detection of an error in downlink data. The terminal performs a CRC (Cyclic Redundancy Check) on the downlink data. If an operation result of the CRC contains no error, the terminal feeds back an acknowledgement (ACK) as the response signal to the base station. If the operation result of the CRC contains an error, the terminal feeds back a negative acknowledgement (NACK) as the response signal to the base station. This response signal (i.e. an ACK/NACK signal) is fed back through an uplink control channel such as the PUCCH (Physical Uplink Control Channel).

In LTE, a plurality of ACK/NACK signals that are transmitted from a plurality of terminals, as shown in FIG. 1, are spread by a ZAC (zero auto-correlation) sequence having zero auto-correlation characteristics on a time axis (multiplied by the ZAC sequence) and code-multiplexed within the PUCCH. In FIG. 1, (W(0), W(1), W(2), W(3)) represents a Walsh sequence having a sequence length of 4 and (F(0), F(1), F(2)) represents a DFT (discrete Fourier transform) sequence having a sequence length of 3.

As shown in FIG. 1, in the terminals, the ACK/NACK signals are first subjected to primary spreading into frequency components each corresponding to one SC-FDMA symbol by the ZAC sequence (sequence length of 12). That is, the ZAC sequence having a sequence length of 12 is multiplied by ACK/NACK signal components represented by complex numbers. Next, the ACK/NACK signals subjected to primary spreading and the ZAC sequence serving as reference signals are subjected to secondary spreading by the Walsh sequence (sequence length of 4: W(0) to W(3)) and the DFT sequence (sequence length of 3: F(0) to F(2)), respectively. That is, the respective components of the signals having a sequence length of 12 (the ACK/NACK signals subjected to primary spreading or the ZAC sequence serving as reference signals) are multiplied by each component of an orthogonal code sequence (OCC: orthogonal cover code, the Walsh sequence, or the DFT sequence). Furthermore, the signals subjected to secondary spreading are converted into signals having a sequence length of 12 on the time axis by inverse discrete Fourier transform (IDFT or IFFT (inverse fast Fourier transform)). Moreover, a cyclic prefix (CP) is appended to each of the signals subjected to IFFT. This forms a one-slot signal composed of seven SC-FDMA symbols.

Further, as shown in FIG. 2, the PUCCH is allocated to each terminal by subframe unit.

ACK/NACK signals from different terminals are spread (multiplied) using a ZAC sequence defined by different cyclic shift amounts (cyclic shift indices) or an orthogonal code sequence corresponding to different sequence numbers (OC indices: orthogonal cover indices). The orthogonal code sequence is a set of a Walsh sequence and a DFT sequence. Further, the orthogonal code sequence is also referred to as "block-wise spreading code sequence". Therefore, by using conventional de-spreading and correlation processing, the base station can demultiplex a plurality of these code-multiplexed ACK/NACK signals (see, for example, NPL 4). It should be noted that since there is a limit to the number of ACK/NACK signals that can be code-multiplexed or cyclic-shift-multiplexed per frequency resource block (RB), an increase in the number of terminals causes the ACK/NACK signals to be frequency-multiplexed onto different RBs. Code and frequency resources through which ACK/NACK signals are transmitted are hereinafter called "PUCCH resources". The number (index) of a PUCCH resource is determined by the RB number of an RB through which to transmit an ACK/NACK signal and an OC index and a cyclic shift amount in the RB. Since multiplexing of a ZAC sequence by cyclic shifts can be deemed as a type of code multiplexing, orthogonal codes and cyclic shifts are hereinafter sometimes collectively referred to as "codes".

In LTE, allocation based on PDCCH or EPDCCH control information mapping results is employed as a method for identifying a PUCCH resource through which to transmit an ACK/NACK signal.

In the case of the PDCCH, the control information is not mapped to the same resources between a plurality of terminals, whereby PDCCH resources and PUCCH resources are associated in one-to-one correspondence with each other. The PDCCH is constituted by one or more L1/L2 CCHs (L1/L2 Control Channels). Each L1/L2 CCH is constituted by one or more CCEs (Control Channel Elements). That is, a CCE is a fundamental unit by which the control information is mapped to the PDCCH. Further, in a case where one L1/L2 CCH is constituted by a plurality of (two, four, or eight) CCEs, the L1/L2 CCH is allocated a plurality of contiguous CCEs beginning at a CCE having an even-numbered index. In accordance with the number of CCEs that are needed for the indication of the control information to a resource allocation target terminal, the base station allocates the L1/L2 CCH to the resource allocation target terminal. Then, the base station maps the control information to a physical resource corresponding to a CCE of this L1/L2 CCH and transmits the control information. Note also here that each CCE is associated in one-to-one correspondence with a PUCCH resource through which to transmit an ACK/NACK signal. Therefore, a terminal having received the L1/L2 CCH identifies a PUCCH resource corresponding to a CCE constituting this L1/L2 CCH and transmits an ACK/NACK signal to the base station through this resource (i.e. a code and a frequency). Note, however, that in a case where the L1/L2 CCH occupies a plurality of contiguous CCEs, the terminal transmits the ACK/NACK signal to the base station through a PUCCH resource corresponding to a CCE having the smallest index of a plurality of PUCCH configuration resources respectively corresponding to the plurality of CCEs. Specifically, the PUCCH resource number $n_{PUCCH}$ is determined according to the following formula (Math. 1) (see, for example, NPL 3).

$$n_{PUCCH} = n_{CCE} + N_{PUCCH} \quad [\text{Math. 1}]$$

Note here that $n_{PUCCH}$ is the PUCCH resource number of the PUCCH resource through which to transmit the ACK/NACK signal. $N_{PUCCH}$ denotes a PUCCH resource offset value that is commonly given within a cell, and $n_{CCE}$ denotes the CCE number of a CCE having the smallest index of the CCEs to which the PDCCH for the terminal is mapped.

In the case of the EPDCCH, a resource for an ACK/NACK signal with respect to a downlink data channel (PDSCH: Physical Downlink Shared Channel) allocated by the EPDCCH is determined by using a PUCCH resource offset that is given from a higher layer for each EPDCCH set and an index of enhanced control channel elements (ECCEs: Enhanced CCEs) serving as element units that constitute each EPDCCH. That is, a PUCCH resource number corresponding to the EPDCCH is determined by using the value of the PUCCH resource offset and the ECCE number of an ECCE having the smallest index of the ECCEs to which the EPDCCH is mapped. Appropriate setting of PUCCH resource offsets corresponding to each separate EPDCCH makes it possible, even in an environment where the PDCCH and one or more EPDCCH sets are used, to appropriately allocate the ACK/NACK signal that the terminal transmits.

While making PUCCH resource offsets take on sufficiently great values makes such operation possible that there is no overlap of PUCCH regions corresponding to a plurality of EPDCCH sets, the total amount of PUCCH resources to be secured increases with the number of EPDCCH sets to be used, with the result that there is an increase in PUCCH overhead.

On the contrary, adjusting PUCCH resource offsets makes such operation possible that a plurality of PUCCH regions overlap. In this case, the total amount of PUCCH resources to be secured can be reduced. Note, however, that a collision of PUCCH resources to be used may occur between EPDCCH sets whose PUCCH regions overlap. In a case where such a collision of PUCCH resources occurs, there is deterioration in downlink throughput, as only one of the EPDCCH sets can be allocated. To address this problem, a control bit called ARO (ACK/NACK resource offset) by which a further offset is indicated is added into EPDCCH control information as a method for avoiding a collision of PUCCH resources while using a plurality of overlapping PUCCH regions. Specifically, a PUCCH resource is determined according to the following formula (Math. 2) (see, for example, NPL 3).

$$n_{PUCCH,EPDCCH} = n_{ECCE(n)} + \Delta_{ARO} + N_{EPDCCH(n)} \quad [\text{Math. 2}]$$

Note here that $n_{PUCCH,EPDCCH}$ is the PUCCH resource number. $N_{EPDCCH(n)}$ is the PUCCH resource offset corresponding to the nth EPDCCH set(n), $\Delta_{ARO}$ is an offset value, and $n_{ECCE(n)}$ is, of the ECCE numbers defined in the EPDCCH set(n), the ECCE number of an ECCE having the smallest index of the ECCEs actually used for the transmission of the EPDCCH. It should be noted that $N_{EPDCCH(n)}$ is a value that is indicated by a UE-specific higher layer.

Incidentally, M2M (machine-to-machine) communication, which achieves services through autonomous communication between machines without users' judgments, has recently been expected as a mechanism that underpins future information societies. Specific cases to which the M2M system is applied include smart grids. A smart grid is an infrastructure system that efficiently supplies a lifeline such as electricity or gas, and autonomously and effectively adjusts demand balance of resources by performing M2M communication between smart meters installed in households or buildings and a central server. Other cases to which the M2M communication system is applied include stock control, a monitoring system for environmental sensing or telemedicine, remote management of stock or charge of self-vending machines, and the like.

In the M2M communication system, attention has been focused, in particular, on the utilization of a cellular system having a wide communication area. In 3GPP, central network upgrading for M2M, called machine-type communication (MTC), is being standardized (see, for example, NPL 5) under LTE and LTE-Advanced standardization, and specifications are being discussed with reduction in cost of terminals, reduction in power consumption, and coverage enhancement as requirements.

In order to achieve reduction in cost of terminals, an LTE Release 13 MTC-compatible terminal (hereinafter sometimes referred to as "MTC terminal") supports only a frequency bandwidth of 1.4 MHz (hereinafter sometimes referred to as "MTC narrow band"). Further, in MTC coverage enhancement for further enlargement of the communication area, a repetition technique is employed by which to enhance coverage by causing received signal power to be improved by repeatedly transmitting the same signal more than once and combining these signals on the receiving side.

CITATION LIST

Non Patent Literature

NPL 1: 3GPP TS 36.211 V12.5.0, "Evolved Universal Terrestrial Radio Access (E-UTRA); Physical channels and modulation (Release 12)," March 2015.
NPL 2: 3GPP TS 36.212 V12.4.0, "Evolved Universal Terrestrial Radio Access (E-UTRA); Multiplexing and channel coding (Release 12)," March 2015.
NPL 3: 3GPP TS 36.213 V12.5.0, "Evolved Universal Terrestrial Radio Access (E-UTRA); Physical layer procedures (Release 12)," March 2015.
NPL 4: Seigo Nakao, Tomofumi Takata, Daichi Imamura, and Katsuhiko Hiramatsu, "Performance enhancement of E-UTRA uplink control channel in fast fading environments," Proceeding of 2009 IEEE 69th Vehicular Technology Conference (VTC2009-Spring), April 2009.
NPL 5: RP-141660, Ericsson, Nokia Networks, "New WI proposal: Further LTE Physical Layer Enhancements for MTC," September 2014.

SUMMARY OF INVENTION

An MTC terminal responds only to a narrower frequency band (MTC narrow band) than an LTE-system-compatible terminal (hereinafter sometimes referred to as "LTE terminal"). Therefore, the MTC terminal cannot demodulate control information allocated to the PDCCH of an existing LTE system disposed over a frequency band that is supported by the existing LTE system. To address this problem, using the EPDCCH as a downlink control channel (MPDCCH: Physical Downlink Control Channel for MTC) through which to transmit control information to the MTC terminal has been considered. However, with direct use of the same method (Mathematical Expression 2) as that used in the existing LTE system, it is difficult to identify a PUCCH resource through the MTC terminal transmits an ACK/NACK signal as a response to downlink data.

An aspect of the present disclosure provides a terminal, a base station, a transmission method, and a reception method that allow an MTC terminal to appropriately identify a PUCCH resource.

A terminal according to an aspect of the present disclosure includes: a receiver that receives the same downlink data over one or more subframes through a downlink resource within a narrow band for MTC terminal; a generator that generates a response signal as a response to the downlink data; and a transmitter that transmits the response signal through an uplink resource a predetermined number of subframes after the last subframe of the one or more subframes, the uplink resource being associated in one-to-one correspondence with the number of a downlink resource to which the downlink data is allocated in the last subframe.

It should be noted that general or specific embodiments may be implemented as a system, a method, an integrated circuit, a computer program, a storage medium, or any selective combination thereof.

An aspect of the present disclosure allows an MTC terminal to appropriately identify a PUCCH resource.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 3 shows an example of a collision of PUCCH resources that occurs due to coverage enhancement levels.

DESCRIPTION OF EMBODIMENTS

Figure 1:
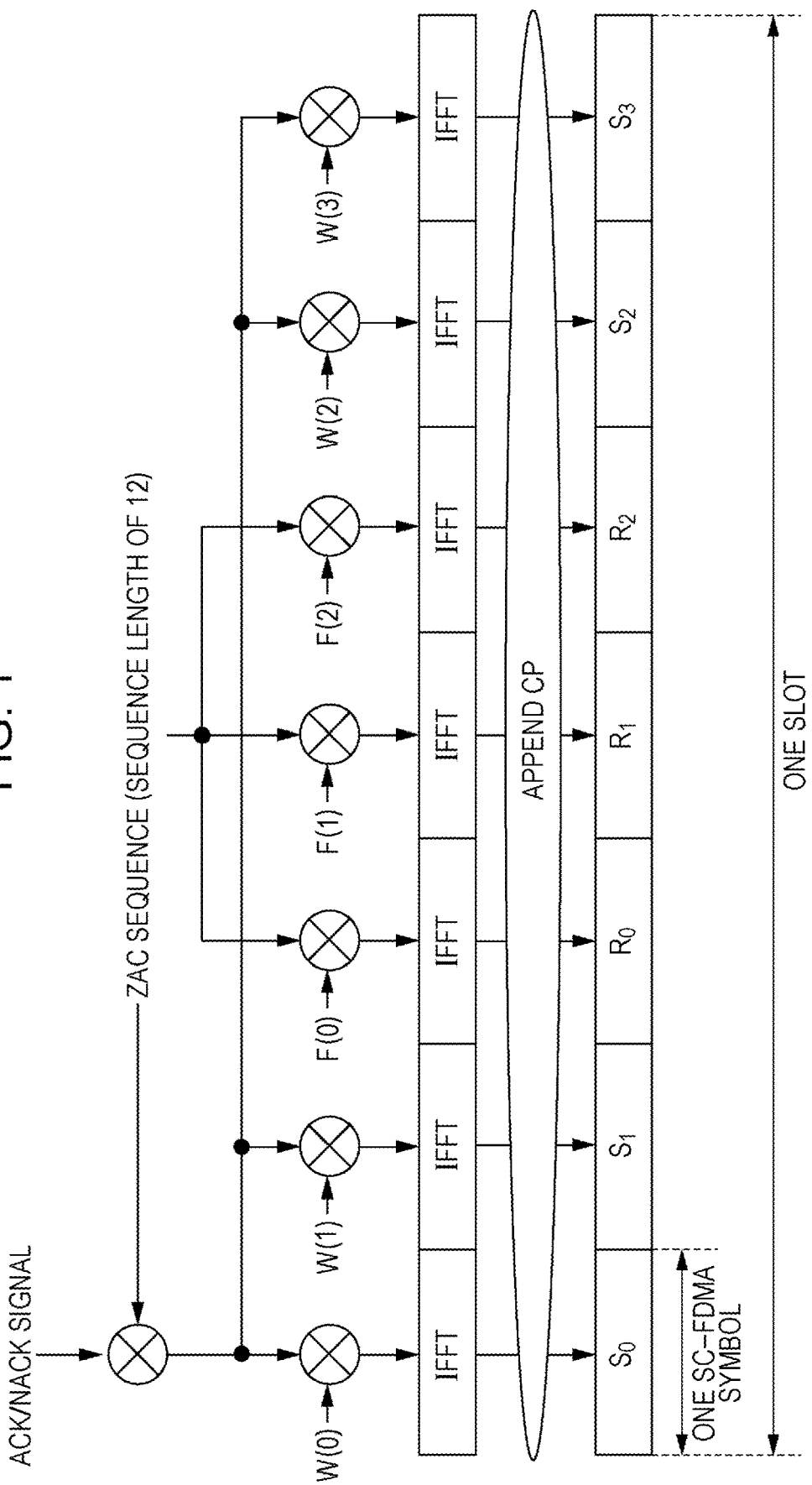
FIG. 1 shows an example of a response signal generation process on the PUCCH.
Figure 2:
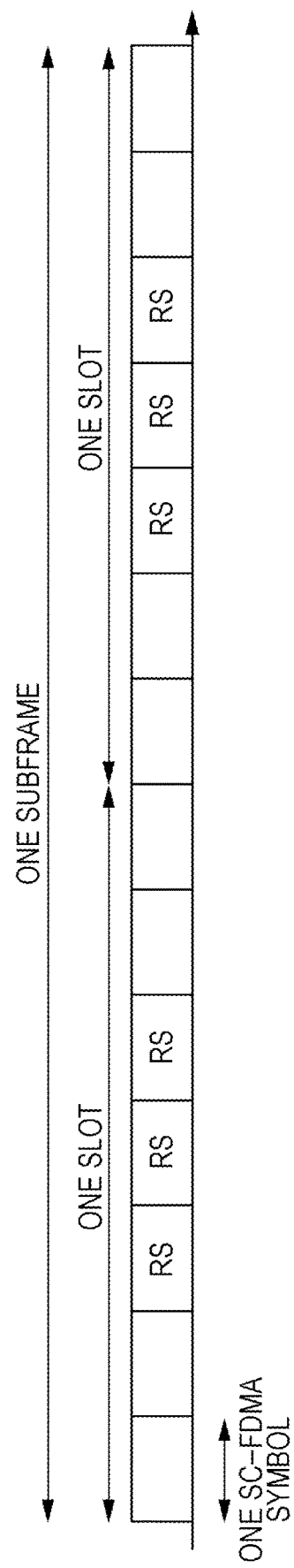
FIG. 2 shows an example of a subframe configuration of the PUCCH.

Embodiments of the present disclosure are described in detail below with reference to the drawings.

[Underlying Knowledge Forming Basis of the Present Disclosure]

In MTC, defining a plurality of coverage enhancement levels has been considered, and different numbers of repetitions are required at each separate coverage enhancement level. In a case where terminals that have different coverage enhancement levels coexist, PUCCH resources through which the plurality of terminals transmit ACK/NACK signals in the same subframe may be associated with the same EPDCCH set and ECCEs between the terminals. For this reason, in a case where a base station implicitly indicates PUCCH resources in one-to-one correspondence with ECCEs used in the EPDCCH, the PUCCH resources through which the plurality of terminals transmit ACK/NACK signals may collide. In this occasion, it is conceivable that a collision of PUCCH resources may be avoided by the ARO according to (Mathematical Expression 2). However, in the case of such an operation that there is an overlap of PUCCH regions between EPDCCH sets, it is necessary to take into account a collision of PUCCH resources between terminals that have different coverage enhancement levels in addition to an overlap of PUCCH regions between EPDCCH sets. This may complicate scheduling or make the existing ARO offset value alone inadequate.

FIG. 3 shows an example of resource allocation in which, for a terminal 1, the number of MPDCCH repetitions is 4, the number of MPDSCH repetitions is 4, and the number of PUCCH repetitions is 4, and for a terminal 2, the number of MPDCCH repetitions is 2, the number of MPDSCH repetitions is 2, and the number of PUCCH repetitions is 2.

In FIG. 3, the base station can transmit the MPDCCH to each of the terminals 1 and 2 through different subframes. This allows the base station to transmit control information to the terminal 1 and the terminal 2 through the same EPDCCH set and ECCEs on the MPDCCH. In this case, the same PUCCH resources associated with the same EPDCCH set and ECCEs are implicitly allocated to the terminal 1 and the terminal 2. Note, however, that the terminal 1 and the terminal 2 need to take into account a collision of PUCCH resources in a case where, as shown in FIG. 3, the terminal 1 and the terminal 2 transmit ACK/NACK signals in the same subframe.

Further, in LTE Release 13 MTC, the base station can perform, on an MTC terminal that requires no repetition transmission (requires no coverage enhancement), same-subframe scheduling by which a PDSCH that is allocated by an MPDCCH is allocated to the same subframe as the MPDCCH and cross-subframe scheduling by which a PDSCH that is allocated by an MPDCCH is allocated to a different subframe from the MPDCCH.

In this case, too, PUCCH resources through which the plurality of terminals transmit ACK/NACK signals in the same subframe may be associated with the same EPDCCH set and ECCEs between the terminals. For this reason, in a case where a base station implicitly indicates PUCCH resources in one-to-one correspondence with ECCEs used in the EPDCCH, the PUCCH resources through which the plurality of terminals transmit ACK/NACK signals may collide. In this occasion, as mentioned above, it is conceivable that a collision of PUCCH resources may be avoided by the ARO according to (Mathematical Expression 2). However, it is necessary to take into account the influence of same-subframe scheduling and cross-subframe scheduling in addition to an overlap of PUCCH regions between EPDDCH sets and a collision of PUCCH resources between terminals that have different coverage enhancement levels. This may complicate scheduling or make the existing ARO offset value alone inadequate.

Figure 4A:
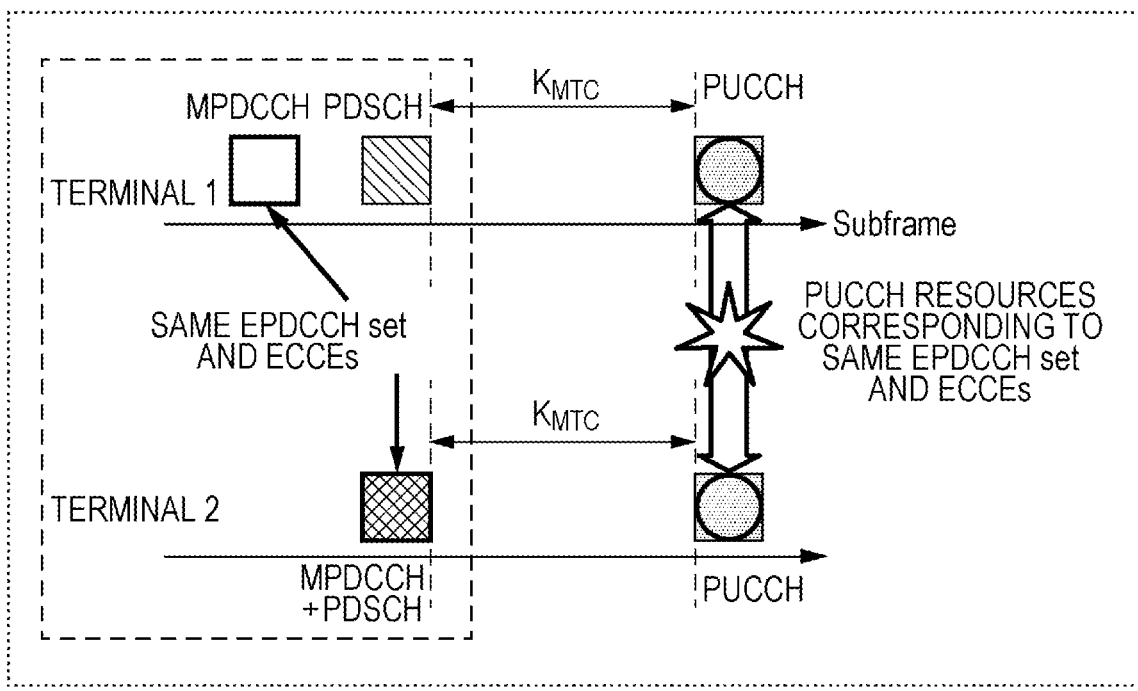
FIG. 4A shows an example of a collision of PUCCH resources that occurs due to a scheduling method.
Figure 4B:
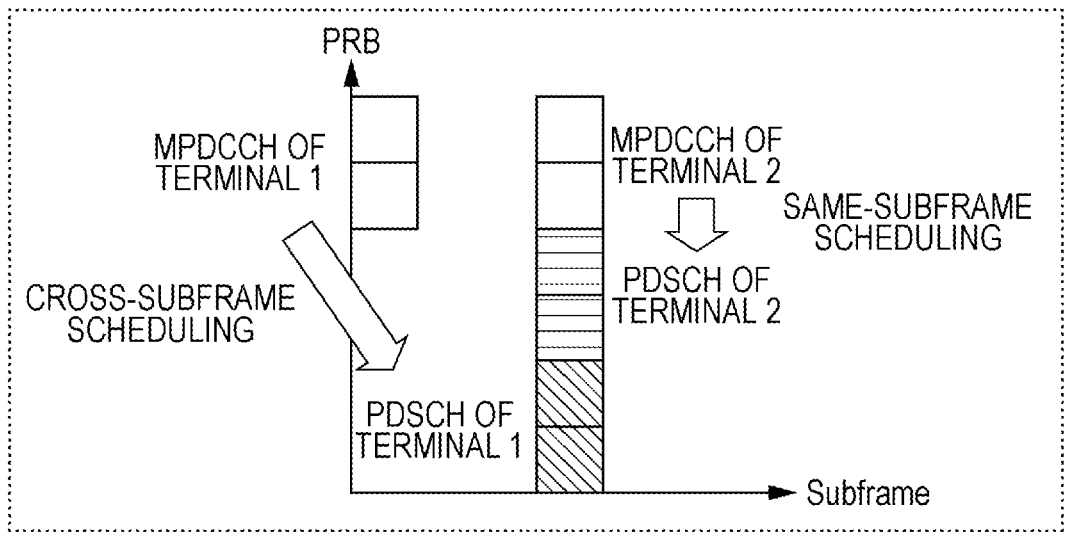
FIG. 4B shows examples of same-subframe scheduling and cross-subframe scheduling.

FIGS. 4A and 4B show an example of resource allocation in which cross-subframe scheduling is applied to the terminal 1 and same-subframe scheduling is applied to the terminal 2. As shown in FIG. 4A, the base station can transmit the MPDCCH to the terminal 1 and the terminal 2 through different subframes, respectively. This allows the base station to transmit control information to the terminal 1 and the terminal 2 through the same EPDCCH set and ECCEs on the MPDCCH. In this case, the same PUCCH resources associated with the same EPDCCH set and ECCEs are implicitly allocated to the terminal 1 and the terminal 2. Note, however, that the terminal 1 and the terminal 2 need to take into account a collision of PUCCH resources in a case where, as shown in FIG. 4A or 4B, the terminal 1 and the terminal 2 transmit ACK/NACK signals in the same subframe.

As noted above, MTC requires, in regard to the method for identifying a PUCCH resource through which to transmit an ACK/NACK signal as a response to a downlink data signal, that a collision of PUCCH resources in a case where a plurality of MTC terminals have transmitted control information through the same EPDCCH set and ECCEs in different subframes be taken into account in addition to an overlap of existing PUCCH resource regions. For this reason, the determination of a PUCCH resource with use of the same method (Mathematical Expression 2) as that used in the existing LTE system may result in a rise in MPDCCH blocking probability and deterioration in throughput.

Further, as mentioned above, an MTC terminal responds only to a narrower frequency band than an existing LTE terminal. Therefore, the MTC terminal cannot demodulate control information allocated to the PDCCH of an existing LTE system disposed over a frequency band that is supported by the existing LTE system. Note here that, on the EPDCCH in the existing LTE system, EPDCCH parameters (such as the PUCCH resource offset corresponding to the EPDCCH set(n)) are configured through UE-specific higher-layer indication after the base station has made an initial connection to an LTE terminal through the PDCCH. Therefore, even with use of the EPDCCH, the LTE terminal needs to perform an initial connection process through the PDCCH.

Meanwhile, since an MTC terminal cannot demodulate control information allocated to the PDCCH, the same EPDCCH-based method for characterizing a PUCCH resource as that used in the existing LTE system cannot make it possible to characterize a PUCCH resource through which to transmit an ACK/NACK signal as a response to Msg4 that the base station transmits to the terminal through the PDSCH in the course of an initial connection process. It is conceivable that the method for characterizing a PUCCH resource through which to transmit an ACK/NACK signal as a response to downlink data may vary between Msg4 and other downlink data signals. However, this is undesirable in terms of making the standard simple. To address this problem, the inventors studied a terminal, a base station, a transmission method, and a reception method that allow an MTC terminal to appropriately identify a PUCCH resource.

[Overview of Communication System]

A communication system according to each embodiment of the present disclosure includes, for example, a base station 100 and a plurality of terminals 200 (MTC terminals) that are compatible with LTE-Advanced systems.

Further, let it be assumed that terminals 200 that have different coverage enhancement levels coexist within the cell of the base station 100. Further, the MTC terminals support a narrower bandwidth (MTC bandwidth, e.g. 1.4 MHz) than the bandwidth of an existing LTE system.

Figure 5:
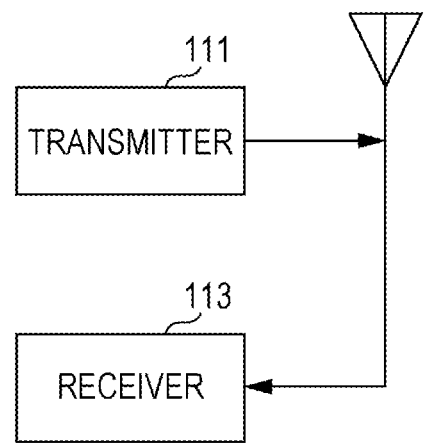
FIG. 5 is a block diagram showing a configuration of main components of a base station according to Embodiment 1.

FIG. 5 is a block diagram showing a configuration of main components of the base station 100 according to an embodiment of the present disclosure. As shown in FIG. 5, the base station 100 includes a transmitter 111 and a receiver 113. The transmitter 111 transmits the same downlink data over one or more subframes through a downlink resource within a narrow band for MTC terminal (MTC narrow band). The receiver 113 receives a response signal (ACK/NACK signal) as a response to the downlink data through an uplink resource a predetermined number of subframes after the last subframe of the one or more subframes, the uplink resource being associated in one-to-one correspondence with the number of a downlink resource to which the downlink data is allocated in the last subframe.

Figure 6:
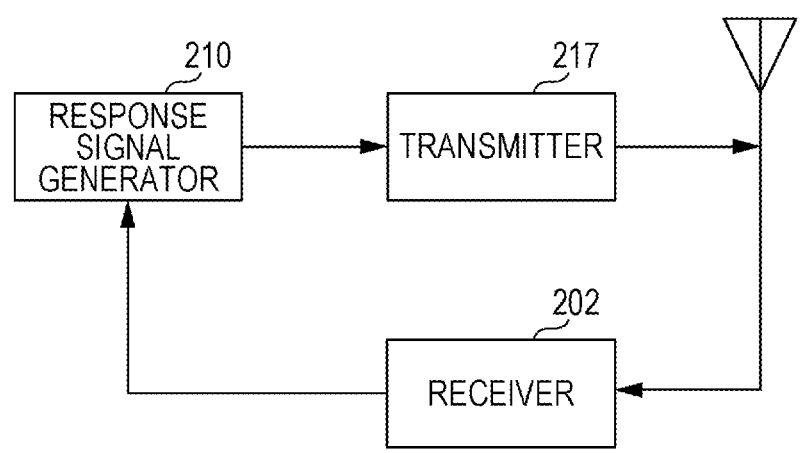
FIG. 6 is a block diagram showing a configuration of main components of a terminal according to Embodiment 1.

Further, FIG. 6 is a block diagram showing a configuration of main components of a terminal 200 according to each embodiment of the present disclosure. As shown in FIG. 6, the terminal 200 includes a receiver 202, a response signal generator 210, and a transmitter 217. The receiver 202 receives the same downlink data over one or more subframes through a downlink resource within a narrow band for MTC terminal (MTC narrow band). The response signal generator 210 generates a response signal (ACK/NACK signal) as a response to the downlink data. The transmitter 217 transmits the response signal through an uplink resource a predetermined number of subframes after the last subframe of the one or more subframes, the uplink resource being associated in one-to-one correspondence with the number of a downlink resource to which the downlink data is allocated in the last subframe.

Embodiment 1

[Configuration of Base Station]

Figure 7:
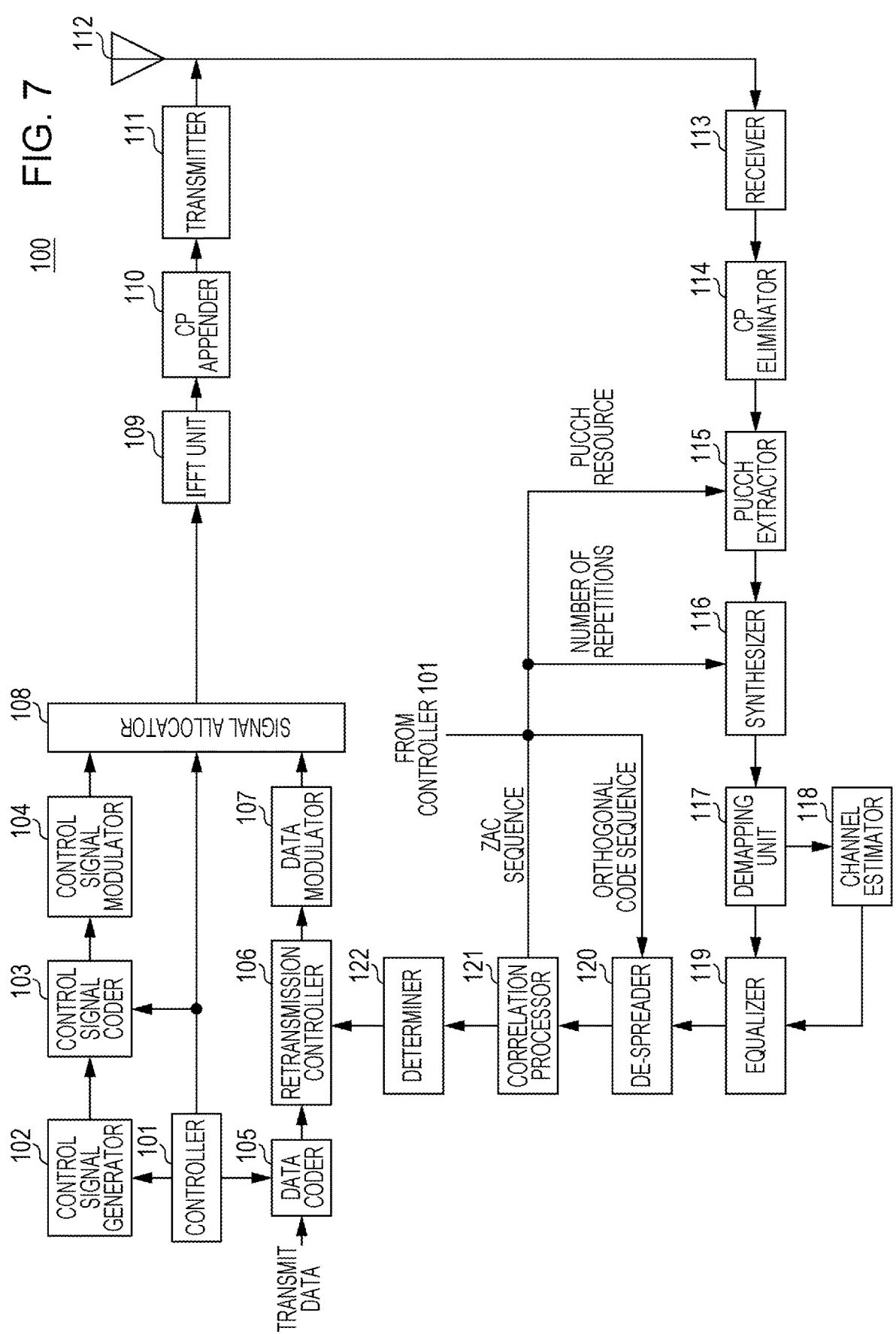
FIG. 7 is a block diagram showing a configuration of the base station according to Embodiment 1.

FIG. 7 is a block diagram showing a configuration of the base station 100 according to Embodiment 1 of the present disclosure.

The base station 100 transmits an MPDCCH and a PDSCH (downlink data) through a downlink. Further, the base station 100 receives, through an uplink, a PUCCH that carries an ACK/NACK signal. Note here that, for the avoidance of complicated explanation, the following mainly shows components involved in the transmission of the MPDCCH and the PDSCH through the downlink and the reception of the PUCCH through the uplink as a response to the downlink data, as they are tied closely to the features of the present embodiment.

Further, as will be described later, the base station 100 generates a downlink control signal (resource allocation information) and a downlink data signal (transmit data) that are each individually coded and modulated.

As shown in FIG. 7, the base station 100 includes a controller 101, a control signal generator 102, a control signal coder 103, a control signal modulator 104, a data coder 105, a retransmission controller 106, a data modulator 107, a signal allocator 108, an IFFT (inverse fast Fourier transform) unit 109, a CP (cyclic prefix) appender 110, a transmitter 111, an antenna 112, a receiver 113, a CP eliminator 114, a PUCCH extractor 115, a synthesizer 116, a demapping unit 117, a channel estimator 118, an equalizer 119, a de-spreader 120, a correlation processor 121, and a determiner 122.

The controller 101 determines the allocation of the PDSCH to an MTC terminal. In so doing, the controller 101 determines a frequency allocation resource, a modulation and coding method, and the like as to which instructions are given to the MTC terminal, and outputs information pertaining to the parameters thus determined to the control signal generator 102.

Further, the controller 101 determines a code level of a control signal and outputs the code level thus determined to the control signal coder 103. Further, the controller 101 determines a radio resource (downlink resource) onto which to map the control signal and the downlink data and outputs information pertaining to the radio resource thus determined to the signal allocator 108. Further, the controller 101 determines a code rate at which to transmit the downlink data (transmit data) to a resource allocation target terminal 200 and outputs the code rate thus determined to the data coder 105.

Further, the controller 101 determines a coverage enhancement level (or the number of repetitions) of an MTC terminal and outputs information pertaining to the coverage enhancement level thus determined to the control signal generator 102 and the synthesizer 116.

Further, the controller 101 determines a PUCCH resource (cyclic shift, orthogonal code sequence, frequency) through which the terminal 200 transmits the PUCCH. For example, the controller 101 identifies a PUCCH resource associated in one-to-one correspondence with the number of a PRB to which a PDSCH is allocated in the last subframe of one or more subframes in which the PDSCH is transmitted. The controller 101 outputs, to the de-spreader 120 and the correlation processor 121, a cyclic shift amount (i.e. a ZAC sequence) and an orthogonal code sequence that may be used for PUCCH transmission, respectively, and outputs, to the PUCCH extractor 115, information pertaining to a frequency resource that is used for PUCCH transmission.

The control signal generator 102 generates a control signal for MTC terminal. The control signal contains a cell-specific higher-layer signal, a UE-specific higher-layer signal, or downlink allocation information giving an instruction to allocate the PDSCH through the MPDCCH. The downlink allocation information is constituted by a plurality of bits and contains information that gives instructions as to the frequency allocation resource, the modulating and coding method, and the like. Further, the downlink allocation information may also contain the information pertaining to the coverage enhancement level.

The control signal generator 102 generates a control information bit sequence with reference to control information inputted from the controller 101 and outputs the control information bit sequence (control signal) thus generated to the control signal coder 103. It should be noted that since the control information may be transmitted for a plurality of terminals 200, the control signal generator 102 generates a bit sequence by incorporating the terminal ID of each terminal 200 into the control information for that terminal 200. For example, a CRC (cyclic redundancy check) bit masked by the terminal ID of a destination terminal is appended to the control information.

Further, the information pertaining to the coverage enhancement level may be indicated to an MTC coverage enhancement terminal by UE-specific higher-layer signaling or, as mentioned above, may be indicated through the MPDCCH.

The control signal coder 103 codes, in accordance with a code level designated by the controller 101, the control signal (control information bit sequence) received from the control signal generator 102, and outputs the control signal thus coded to the control signal modulator 104.

The control signal modulator 104 modulates the control signal received from the control signal coder 103 and outputs the control signal thus modulated (symbol sequence) to the signal allocator 108.

The data coder 105 performs error-correcting coding such as turbo coding on the transmit data (downlink data) in accordance with the code rate received from the controller 101 and outputs the data signal thus coded to the retransmission controller 106.

The retransmission controller 106, at the time of a first transmission, retains the data signal thus coded, which has been received from the data coder 105, and outputs the data signal thus coded to the data modulator 107. The retransmission controller 106 retains, for each destination terminal, the data signal thus coded. Further, upon receiving a NACK from the determiner 122 as a response to the transmitted data signal, the retransmission controller 106 outputs the corresponding retained data to the data modulator 107. Upon receiving an ACK from the determiner 122 as a response to the transmitted data signal, the retransmission controller 106 erases the corresponding retained data.

The data modulator 107 modulates the data signal received from the retransmission controller 106 and outputs a data modulation signal to the signal allocator 108.

The signal allocator 108 maps, to the radio resource designated by the controller 101, the control signal (symbol sequence) received from the control signal modulator 104 and the data modulation signal received from the data modulator 107. It should be noted that the control channel to which the control signal is mapped is the MPDCCH. The signal allocator 108 outputs, to the IFFT unit 109, a downlink subframe signal to which the control signal or the data modulation signal has been mapped.

The IFFT unit 109 converts a frequency domain signal into a time domain signal by performing an IFFT process on the signal received from the signal allocator 108. The IFFT unit 109 outputs the time domain signal to the CP appender 110.

The CP appender 110 appends a CP to the signal received from the IFFT unit 109 and outputs, to the transmitter 111, the signal to which the CP has been appended (OFDM signal).

The transmitter 111 performs an RF (radio frequency) process such as D/A (digital-to-analog) conversion or up conversion on the OFDM signal received from the CP appender 110 and transmits a radio signal to the terminal 200 via the antenna 112.

The receiver 113 performs an RF process such as down conversion or A/D (analog-to-digital) conversion on an uplink signal (PUCCH) from the terminal 200 received via the antenna 112 and outputs the resulting received signal to the CP eliminator 114. For example, the uplink signal (PUCCH) that is transmitted from the terminal 200 contains a signal subjected to a repetition process over a plurality of subframes.

The CP eliminator 114 eliminates the CP appended to the received signal received from the receiver 113 and outputs, to the PUCCH extractor 115, the signal from which the CP has been eliminated.

On the basis of information pertaining to a PUCCH resource that is received from the controller 101, the PUCCH extractor 115 applies an FFT process to the signal received from the CP eliminator 114, decomposes the signal into a frequency-domain signal sequence, extracts a signal corresponding to the PUCCH, and outputs the PUCCH signal thus extracted to the synthesizer 116.

The synthesizer 116 synthesizes, with reference to the information pertaining to the coverage enhancement level (or the information pertaining to the number of repetitions) as inputted from the controller 101, the PUCCH over a plurality of subframes transmitted repeatedly, and outputs the signal thus synthesized to the demapping unit 117.

The demapping unit 117 decomposes the signal (i.e. a subframe portion of the PUCCH) received from the synthesizer 116 into a reference signal and a response signal, outputs the reference signal to the channel estimator 118, and outputs the response signal to the equalizer 119.

The channel estimator 118 performs a channel estimation with reference to the reference signal inputted from the demapping unit 117. The channel estimator 118 outputs the resulting channel estimate value to the equalizer 119.

The equalizer 119 equalizes, with reference to the channel estimate value inputted from the channel estimator 118, the response signal inputted from the demapping unit 117. The equalizer 119 outputs the response signal thus equalized to the de-spreader 120.

The de-spreader 120 de-spreads, with use of the orthogonal code sequence received from the controller 101 (i.e. the orthogonal code sequence that the terminal 200 should use), that portion of the signal received from the equalizer 119 which is equivalent to the response signal, and outputs the signal thus de-spread to the correlation processor 121.

The correlation processor 121 calculates a correlation value between the ZAC sequence (i.e. the ZAC sequence that the terminal 200 may use, i.e. a cyclic shift amount) as inputted from the controller 101 and the signal inputted from the de-spreader 120 and outputs the correlation value to the determiner 122.

The determiner 122 determines, on the basis of the correlation value received from the correlation processor 121, whether the response signal transmitted from the terminal 200 represents an ACK or a NACK as a response to the transmitted data. The determiner 122 outputs a result of the determination to the retransmission controller 106.

[Configuration of Terminal]

Figure 8:
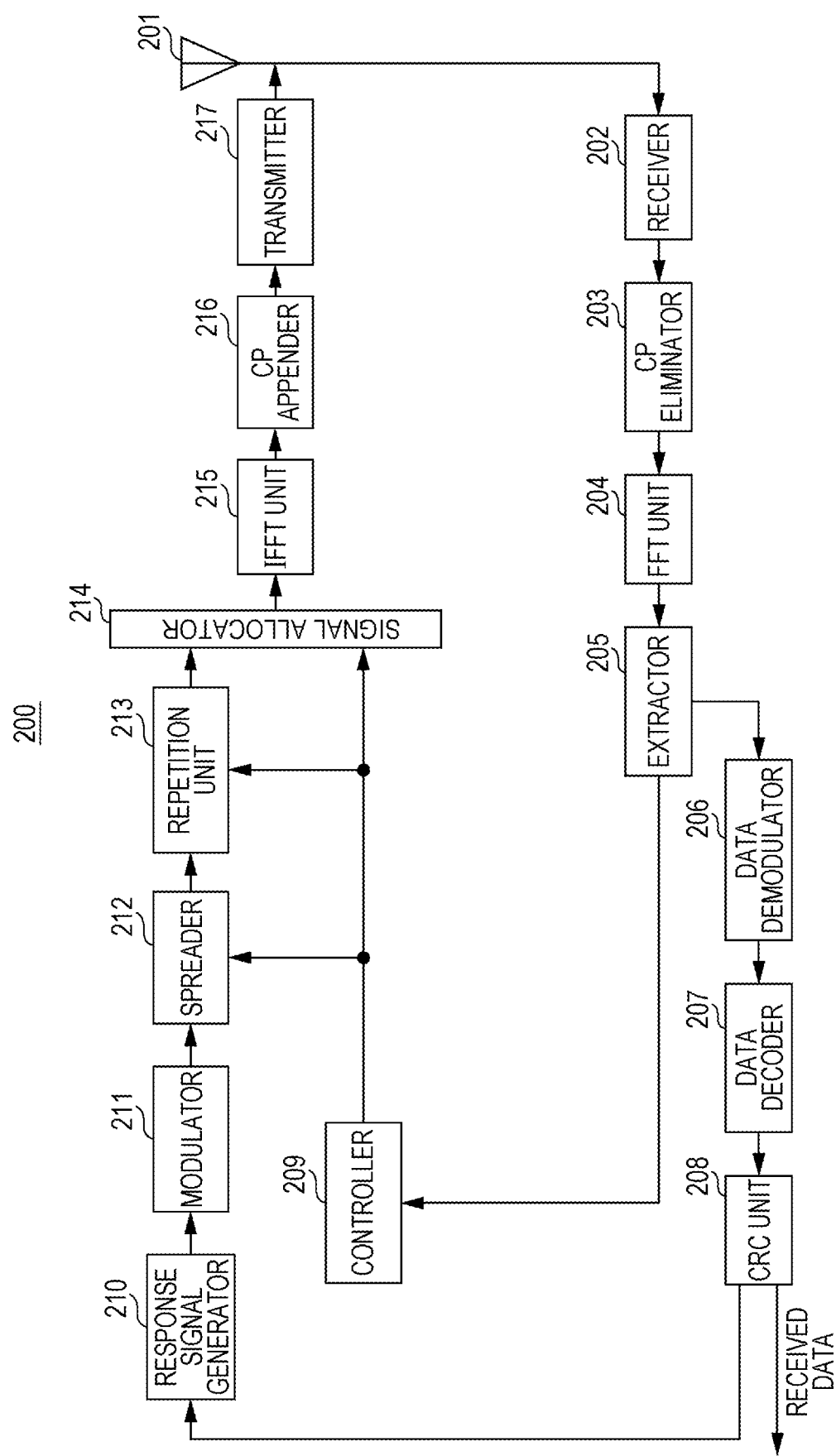
FIG. 8 is a block diagram showing a configuration of the terminal according to Embodiment 1.

FIG. 8 is a block diagram showing a configuration of a terminal 200 according to Embodiment 1 of the present disclosure.

The terminal 200 receives an MPDCCH and a PDSCH (downlink data) through a downlink. Further, the terminal 200 transmits, through an uplink, a PUCCH that carries an ACK/NACK signal. Note here that, for the avoidance of complicated explanation, the following mainly shows components involved in the reception of the MPDCCH and the PDSCH through the downlink and the transmission of the PUCCH through the uplink as a response to the downlink data, as they are tied closely to the features of the present embodiment.

Further, the terminal 200 receives a downlink control signal (resource allocation information) and a downlink data signal (transmit data) that are each individually coded and modulated.

As shown in FIG. 8, the terminal 200 includes an antenna 201, a receiver 202, a CP eliminator 203, an FFT unit 204, an extractor 205, a data demodulator 206, a data decoder 207, a CRC unit 208, a controller 209, a response signal generator 210, a modulator 211, a spreader 212, a repetition unit 213, a signal allocator 214, an IFFT unit 215, a CP appender 216, and a transmitter 217.

The receiver 202 obtains a baseband OFDM signal by performing an RF process such as down conversion or AD conversion on a radio signal (MPDCCH or EPDCCH) from the base station 100 received via the antenna 201. The receiver 202 outputs the OFDM signal to the CP eliminator 203.

The CP eliminator 203 eliminates the CP appended to the OFDM signal received from the receiver 202 and outputs, to the FFT unit 204, the signal from which the CP has been eliminated.

The FFT unit 204 converts a time domain signal into a frequency domain signal by performing an FFT process on the signal received from the CP eliminator 203. The FFT unit 204 outputs the frequency domain signal to the extractor 205.

The extractor 205 extracts the MPDCCH from the frequency domain signal received from the FFT unit 204. The extractor 205 performs blind decoding on the MPDCCH in an attempt to decode a control signal addressed to the terminal 200. Appended to the control signal addressed to the terminal 200 is a CRC masked by the terminal ID of the terminal 200. Therefore, if the CRC determination is OK as a result of the blind decoding, the extractor 205 extracts the control information and outputs it to the controller 209. Further, the extractor 205 extracts downlink data (PDSCH signal) from the signal received from the FFT unit 204 and outputs the downlink data to the data demodulator 206.

The data demodulator 206 demodulates the downlink data received from the extractor 205 and outputs the downlink data thus demodulated to the data decoder 207.

The data decoder 207 decodes the downlink data received from the data demodulator 206 and outputs the downlink data thus decoded to the CRC unit 208.

The CRC unit 208 performs error detection with CRC on the downlink data received from the data decoder 207 and outputs a result of the error detection to the response signal generator 210. Further, the CRC unit 208 outputs, as received data, downlink data determined to be free of errors as the result of the error detection.

The controller 209 controls PUCCH transmission in accordance with the control signal inputted from the extractor 205. Specifically, the controller 209 identifies a PUCCH resource (i.e. a frequency, a cyclic shift amount, and an orthogonal code sequence) with reference to information needed for the identification of a PUCCH resource and outputs the information thus identified to the spreader 212 and the signal allocator 214. For example, the controller 209 identifies a PUCCH resource associated in one-to-one correspondence with the number of a PRB to which a PDSCH is allocated in the last subframe of one or more subframes in which the PDSCH was received.

Further, in a case where the control signal contains information pertaining to information pertaining to a coverage enhancement level, the controller 209 determines the number of repetitions at the time of PUCCH repetition transmission on the basis of the information and indicates to the repetition unit 213 information indicating the number of repetitions thus determined.

Further, in a case where the information pertaining to the coverage enhancement level is indicated from the base station 100 on a higher layer, the controller 209 determines the number of repetitions at the time of PUCCH repetition transmission on the basis of the information thus indicated and outputs to the repetition unit 213 information indicating the number of repetitions thus determined.

The response signal generator 210 generates an ACK/NACK signal (response signal) as a response to the received downlink data (PDSCH signal) on the basis of the error detection result received from the CRC unit 208. Specifically, the response signal generator 210 generates a NACK in a case where an error has been detected and generates an ACK in a case where no error has been detected. The response signal generator 210 outputs the ACK/NACK signal thus generated to the modulator 211.

The modulator 211 modulates the ACK/NACK signal received from the response signal generator 210 and outputs the ACK/NACK signal thus modulated to the spreader 212.

The spreader 212 subjects a reference signal and the ACK/NACK signal received from the modulator 211 to primary spreading by using a ZAC sequence defined by a cyclic shift amount set by the controller 209. Further, the spreader 212 subjects the ACK/NACK signal and the reference signal to secondary spreading by using an orthogonal code sequence set by the controller 209 and outputs the signals subjected to secondary spreading to the repetition unit 213.

In a case where the terminal 200 is in an MTC coverage enhancement mode, the repetition unit 213 generates a repetition signal by, on the basis of the number of repetitions indicated by the controller 209, repeating over a plurality of subframes the signal inputted from the spreader 212. The repetition unit 213 outputs the repetition signal to the signal allocator 214.

The signal allocator 214 maps, on the basis of the PUCCH time and frequency resources indicated by the controller 209, the signal received from the repetition unit 213. The signal allocator 214 outputs, to the IFFT unit 215, the PUCCH signal to which the signal has been mapped.

The IFFT unit 215 generates a time domain signal by performing an IFFT process on the frequency-domain PUCCH signal inputted from the signal allocator 214. The IFFT unit 215 outputs the signal thus generated to the CP appender 216.

The CP appender 216 appends a CP to the time domain signal received from the IFFT unit 215 and outputs, to the transmitter 217, the signal to which the CP has been appended.

The transmitter 217 performs an RF process such as D/A conversion or up conversion on the signal received from the CP appender 216 and transmits a radio signal to the base station 100 via the antenna 201.

[Operation of Base Station 100 and Terminals 200]

The following describes in detail how the base station 100 thus configured and the terminals 200 thus configured operate.

Figure 9:
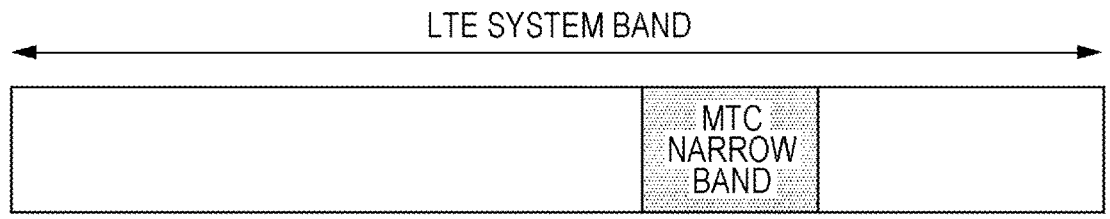
FIG. 9 is a diagram showing an example of an MTC narrow band within an LTE system band.

The following description is given by taking, as an example, a case where the base station 100 performs communication with existing LTE terminals in an existing LTE system band (e.g. 20 MHz) and, as shown in FIG. 9, performs communication with MTC terminals (terminals 200) using an MTC narrow band for MTC terminal (e.g. 1.4 MHz). It should be noted that the MTC narrow band may be placed in the same position within the system band for each subframe or may be placed in a different position within the system band for each subframe.

The base station 100 places the MPDCCH in a predetermined frequency domain within the MTC narrow band. The base station 100 may indicate the MTC terminals by a broadcast signal of the position within the MTC narrow band in which the MPDCCH is placed. Further, such a configuration is possible that the MPDCCH is placed in a predetermined position within the MTC narrow band, and in this case, it is possible to omit the process by which the base station 100 nidicates the MTC terminals of information pertaining to the position within the MTC narrow band in which the MPDCCH is placed.

The base station 100 decides which terminal 200 to allocate data to in each subframe and arranges scheduling for the PDSCH within the MTC narrow band. The base station 100 generates control information addressed to each terminal 200 containing a scheduling result and maps the control information to the MPDCCH. After that, the base station 100 transmits the MPDCCH control information and the PDSCH downlink data to the MTC terminal.

Further, in the following description, repetition transmission of a signal of each channel (MPDCCH, PDSCH, and PUCCH) is performed on the basis of a coverage enhancement level set for each terminal 200 (MTC terminal).

Further, either same-subframe scheduling by which the MPDCCH and the PDSCH are mapped to the same subframe or cross-subframe scheduling by which the MPDCCH and the PDSCH are mapped to different subframes is applied to each terminal 200.

The terminal 200 extracts and decodes, on the basis of the control information obtained by blind decoding of the MPDCCH, a data signal allocated to the PDSCH. Further, the terminal 200 identifies, on the basis of the PDSCH scheduling result (PDSCH allocation resource) contained in the control information, a PUCCH resource (code and frequency resource) through which to transmit an ACK/NACK signal corresponding to the received data (PDSCH). Then, the terminal 200 transmits the PUCCH (ACK/NACK signal) through the PUCCH resource thus identified.

Let it be assumed here that the transmission timing at which the ACK/NACK signal is transmitted is $K_{MTC}$ subframes (e.g. $K_{MTC}$=four subframes) after the subframe in which the terminal 200 received the PDSCH signal. It should be noted that in a case where the PDSCH is repeatedly transmitted, the ACK/NACK signal is transmitted $K_{MTC}$ subframes after the last subframe of a plurality of subframes in which the PDSCH is repeatedly transmitted.

As mentioned above, in a case where the coverage enhancement levels for the plurality of MTC terminals (the numbers of repetitions for the MPDCCH or the PDSCH) are different (see, for example, FIG. 3) or in a case where the scheduling method (same-subframe scheduling or cross-subframe scheduling) that is applied to each MTC terminal is different (see, for example, FIG. 4A), the MTC terminals may differ in the transmission timing of the MPDCCH corresponding to the PUCCH that is transmitted in the same subframe. For this reason, with the conventional method by which a resource (ECCE) used for the transmission of resource allocation information on the MPDCCH and a PUCCH resource are associated in one-to-one correspondence with each other, there has been a risk of a collision of PUCCH resources between MTC terminals.

On the other hand, in the present embodiment, a PUCCH resource through which an MTC terminal transmits an ACK/NACK signal is associated in one-to-one correspondence with a downlink resource (PRB) used for the transmission of downlink data (PDSCH) as a response to the ACK/NACK signal. More specifically, in the present embodiment, a PUCCH resource through which an MTC terminal transmits an ACK/NACK signal is associated in one-to-one correspondence with the PRB number of a PRB to which the PDSCH is allocated in the last subframe of a plurality of subframes in which the repetition of the PDSCH to the ACK/NACK signal is performed.

For example, in the present embodiment, the terminal 200 identifies a PUCCH resource according to the following formula (Math. 3).

$$n_{PUCCH,MTC} = n_{PRB} + N_{PUCCH,MTC}$$ [Math. 3]

Note here that $n_{PUCCH,MTC}$ is the PUCCH resource number of a PUCCH resource that is used for the transmission of an ACK/NACK signal. $N_{PUCCH,MTC}$ denotes a PUCCH resource offset value that is commonly given to MTC terminals within a cell, and $n_{PRB}$ denotes the PRB number of a PRB having the smallest index of those of PRBs constituting the MTC narrow band to which the PDSCH is mapped in the last subframe of PDSCH repetition to the MTC terminal.

In this way, the terminal 200 identifies an ACK or a NACK according to a result of determination of a data signal and transmits an ACK/NACK signal through the PUCCH resource thus identified. That is, the terminal 200 transmits the ACK/NACK signal through a PUCCH resource a predetermined number of subframes after the last subframe of the one or more subframes, the PUCCH resource being associated in one-to-one correspondence with the PRB number of a PRB to which the PDSCH is allocated in the last subframe (i.e. the PRB number of a PRB having the smallest index).

Meanwhile, the base station 100 identifies, from the PRB number of a PRB to which a PDSCH repeatedly transmitted to an MTC terminal is allocated in the last subframe of a plurality of subframes to which the PDSCH is mapped, a PUCCH resource through which the MTC terminal transmits an ACK/NACK signal as a response to the PDSCH. Then, the base station 100 receives the ACK/NACK signal from the terminal 200 through the PUCCH resource thus identified. That is, the base station 100 receives an ACK/NACK signal as a response to the PDSCH through a PUCCH resource a predetermined number of subframes after the last subframe of the one or more subframes, the PUCCH resource being associated in one-to-one correspondence with the PRB number of a PRB to which the PDSCH is allocated in the last subframe (i.e. the PRB number of a PRB having the smallest index).

As mentioned above, an ACK/NACK signal that is mapped to the PUCCH is transmitted $K_{MTC}$ subframes after the last subframe of one or more subframes in which the PDSCH is transmitted. That is, a plurality of MTC terminals that transmit the PUCCH in the same subframe are the same in the last subframe in which the PDSCH is transmitted. In other words, a plurality of MTC terminals that transmit the PUCCH in the same subframe are the same in difference (timing difference) between the transmission timing of the PUCCH and the last subframe of the PDSCH (i.e. $K_{MTC}$ subframes).

Note here that there is no overlap in scheduling of PDSCH resources for each separate MTC terminal in the same subframe. That is, it is always the case that different PDSCH resources (PRBs) are scheduled for each separate MTC terminal in the same subframe. Accordingly, in a case where the last subframes of subframes to which the PDSCH to be transmitted to a plurality of MTC terminals is mapped are identical in timing, the PRB numbers of PRBs that are allocated to the PDSCH for each separate MTC terminal in the subframe are always different.

Thus, by associating the PRB number of a PRB allocated to a PDSCH in the last subframe of the PDSCH in one-to-one correspondence with a PUCCH resource that is used for the transmission of an ACK/NACK signal as a response to the PDSCH, a collision of PUCCH resources in the same subframe can be avoided even in a case where MTC terminals differ in coverage enhancement level or scheduling method from each other.

In the following, a method for allocating PUCCH resources is specifically described with reference to FIG. 10 and FIGS. 11A and 11B.

Figure 10:
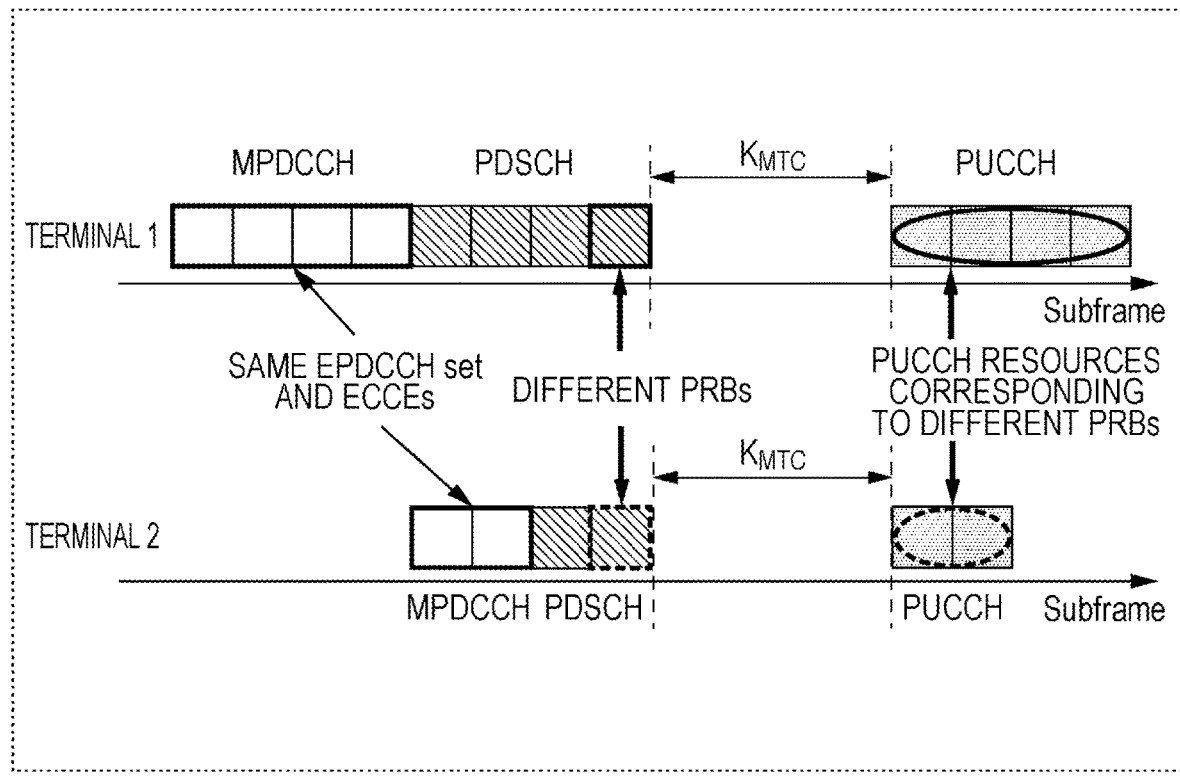
FIG. 10 is a diagram showing an example of a method for identifying a PUCCH resource according to Embodiment 1.

First, FIG. 10 shows an example in which, for a terminal 1, the number of MPDCCH repetitions is 4, the number of MPDSCH repetitions is 4, and the number of PUCCH repetitions is 4, and for a terminal 2, the number of MPDCCH repetitions is 2, the number of MPDSCH repetitions is 2, and the number of PUCCH repetitions is 2. That is, in FIG. 10, the terminal 1 and the terminal 2 differ in coverage enhancement level from each other.

In FIG. 10, as in FIG. 3, the base station 100 transmits the MPDCCH to each of the terminals 1 and 2 (terminals 200) through different subframes. In so doing, the base station 100 transmits control information to the terminal 1 and the terminal 2 through the same EPDCCH set and ECCEs on the MPDCCH.

Further, as shown in FIG. 10, the PDSCH is allocated to the terminal 1 and the terminal 2 in the same last subframe. That is, the terminal 1 and the terminal 2 transmit ACK/NACK signals at the same timing ($K_{MTC}$ subframes after the transmission timing of the PDSCH).

Note, however, that, in FIG. 10, the PUCCH resources through which the terminal 1 and the terminal 2 transmit the ACK/NACK signals are associated in one-to-one correspondence with the PRB number of a PRB allocated to the last subframe of the PDSCH allocated to the terminal 1 and the terminal 2. Moreover, as shown in FIG. 10, since the PDSCH is allocated to the terminal 1 and the terminal 2 in the same last subframe, different PRBs are allocated to the terminal 1 and the terminal 2 in the last subframe. Accordingly, in FIG. 10, the PUCCH resources through which the terminal 1 and the terminal 2 transmit the ACK/NACK signals are different resources associated with different PRBs.

For this reason, in FIG. 10, there occurs no collision of PUCCH resources that the terminal 1 and the terminal 2 use, respectively, although the terminal 1 and the terminal 2 receive the MPDCCH (control information) through the same EPDCCH set and ECCEs in different subframes and transmit the PUCCH at the same timing.

Figure 11A:
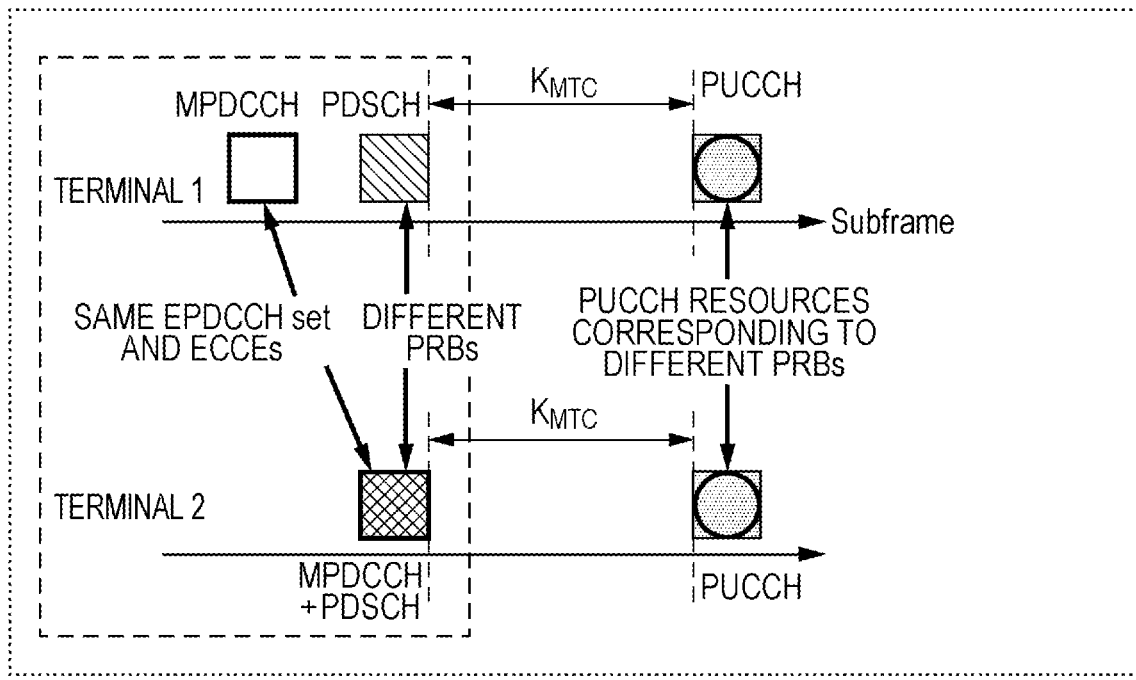
FIG. 11A is a diagram showing an example of MPDCCH, PDSCH, and PUCCH allocation according to Embodiment 1.
Figure 11B:
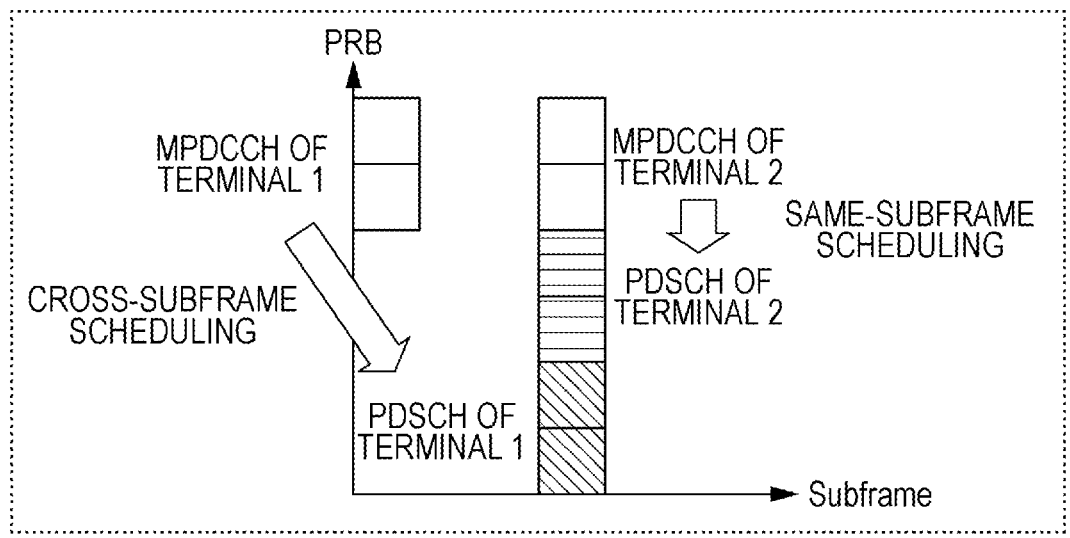
FIG. 11B shows examples of same-subframe scheduling and cross-subframe scheduling.

Next, FIGS. 11A and 11B show an example of resource allocation in which cross-subframe scheduling is applied to the terminal 1 and same-subframe scheduling is applied to the terminal 2. That is, in FIGS. 11A and 11B, the terminal 1 and the terminal 2 differ in scheduling method from each other.

In FIG. 11A, as in FIG. 4A, the base station 100 transmits the MPDCCH to the terminal 1 and the terminal 2 through different subframes, respectively. In so doing, the base station 100 transmits control information to the terminal 1 and the terminal 2 through the same EPDCCH set and ECCEs on the MPDSCCH.

Further, as shown in FIG. 11A, the PDSCH is allocated to the terminal 1 and the terminal 2 in the same last subframe. That is, the terminal 1 and the terminal 2 transmit ACK/NACK signals at the same timing ($K_{MTC}$ subframes after the transmission timing of the PDSCH).

Note, however, that, in FIG. 11A, as in FIG. 10, the PUCCH resources through which the terminal 1 and the terminal 2 transmit the ACK/NACK signals are associated in one-to-one correspondence with the PRB number of a PRB allocated to the last subframe of the PDSCH allocated to the terminal 1 and the terminal 2. Moreover, as shown in FIG. 11A, since the PDSCH is allocated to the terminal 1 and the terminal 2 in the same last subframe, different PRBs are allocated to the terminal 1 and the terminal 2 in the last subframe. Accordingly, in FIG. 11A, the PUCCH resources through which the terminal 1 and the terminal 2 transmit the ACK/NACK signals are different resources associated with different PRBs.

For this reason, in FIG. 11A, there occurs no collision of PUCCH resources that the terminal 1 and the terminal 2 use, respectively, although the terminal 1 and the terminal 2 receive the MPDCCH (control information) through the same EPDCCH set and ECCEs in different subframes and transmit the PUCCH at the same timing.

As noted above, in the present embodiment, the PRB number of a PRB to which a PDSCH is mapped in the last subframe of PDSCH repetition (or, in a case where PDSCH repetition is not applied, the PDSCH is simply mapped) and a PUCCH resource to which an ACK/NACK signal corresponding to the PDSCH is mapped are associated in one-to-one correspondence with each other. This makes it possible to avoid a collision of PUCCH resources due to a difference in coverage enhancement level or scheduling method (same-subframe scheduling or cross-subframe scheduling) between a plurality of MTC terminals.

Accordingly, in regard to the method for identifying a PUCCH resource through which to transmit an ACK/NACK signal in MTC, the present embodiment makes it possible to reduce the influence of a collision of PUCCH resources in a case where a plurality of MTC terminals have transmitted control information through the same EPDCCH set and ECCEs in different subframes. This makes it possible to suppress the rise in MPDCCH blocking probability and prevent the deterioration in throughput.

Further, the PUCCH resource offset value ($N_{PUCCH,MTC}$) according to (Mathematical Expression 3) is information of which the base station 100 indicates an MTC terminal by using a broadcast signal for MTC (such as MTC SIB). Accordingly, the terminal 200 can obtain necessary parameters for the identification of a PUCCH resource prior to an initial connection process, although the terminal 200 cannot demodulate control information allocated to the PDCCH of an existing LTE system. This allows the terminal 200 to also identify a PUCCH resource through which to transmit an ACK/NACK signal as a response to Msg4 that the base station 100 transmits to the terminal 200 through the PDSCH in the course of an initial connection process.

As noted above, the present embodiment allows an MTC terminal to appropriately identify a PUCCH resource.

(Variation 1)

In the foregoing embodiment, a description was given of a case where there is one MTC narrow band within a system band as shown in FIG. 9. However, there may be two or more MTC narrow bands placed within a system band (e.g. 20 MHz).

In a case where two or more MTC narrow bands are configured, PRB numbers may be each independently defined in the plurality of MTC narrow bands. In this case, transmission of the PDSCH by different PRB numbers in different MTC narrow bands causes a collision of PUCCH resources associated with the PRB numbers by which the PDSCH was transmitted.

In this way, it is necessary to also take into account a collision of PUCCH resources between the plurality of MTC narrow bands. To address this problem, Variation 1 describes a method for allocating PUCCH resources in a case where there are a plurality of MTC narrow bands placed within a system band.

Figure 12:
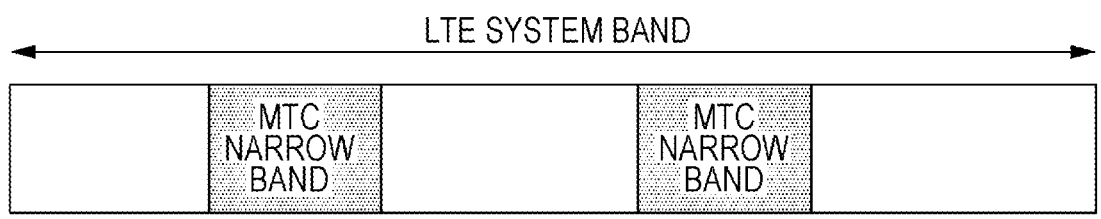
FIG. 12 is a diagram showing examples of MTC narrow bands within an LTE system band.

For example, a description is given by taking, as an example, a case where the base station 100 performs communication with existing LTE terminals in an existing LTE system band (e.g. 20 MHz) and, as shown in FIG. 12, performs communication with two MTC terminals (terminals 200) using two MTC narrow bands (e.g. 1.4 MHz). It should be noted that the number of MTC narrow bands is not limited to 2 but may be 3 or more. Further, each MTC narrow band may be placed in the same position within the system band for each subframe or may be placed in a different position within the system band for each subframe.

For example, in Variation 1, a terminal 200 identifies a PUCCH resource according to the following formula (Math. 4) by using an MTC narrow band number in addition to a PRB number.

$$n_{PUCCH,MTC} = (n_{PRB} + 6n_{NB}) + N_{PUCCH,MTC} \quad \text{[Math. 4]}$$

Note here that $n_{PUCCH,MTC}$ is the PUCCH resource number of a PUCCH resource that is used for the transmission of an ACK/NACK signal. $N_{PUCCH,MTC}$ denotes a PUCCH resource offset value that is commonly given to MTC terminals within a cell, and $n_{PRB}$ denotes the PRB number of a PRB having the smallest index of those of PRBs constituting an MTC narrow band to which the PDSCH is mapped in the last subframe of PDSCH repetition to the MTC terminal. $n_{PRB}$ may take on the same value in each of the plurality of MTC narrow bands.

Further, $n_{NB}$ denotes the number of an MTC narrow band to which the PDSCH is mapped in the last subframe of PDSCH repetition to the terminal.

Further, the numerical value "6" in Formula (4) represents the number of PRBs that constitute each MTC narrow band. This numerical value may be changed according to the number of PRBs that constitute the MTC narrow band.

Figure 13:
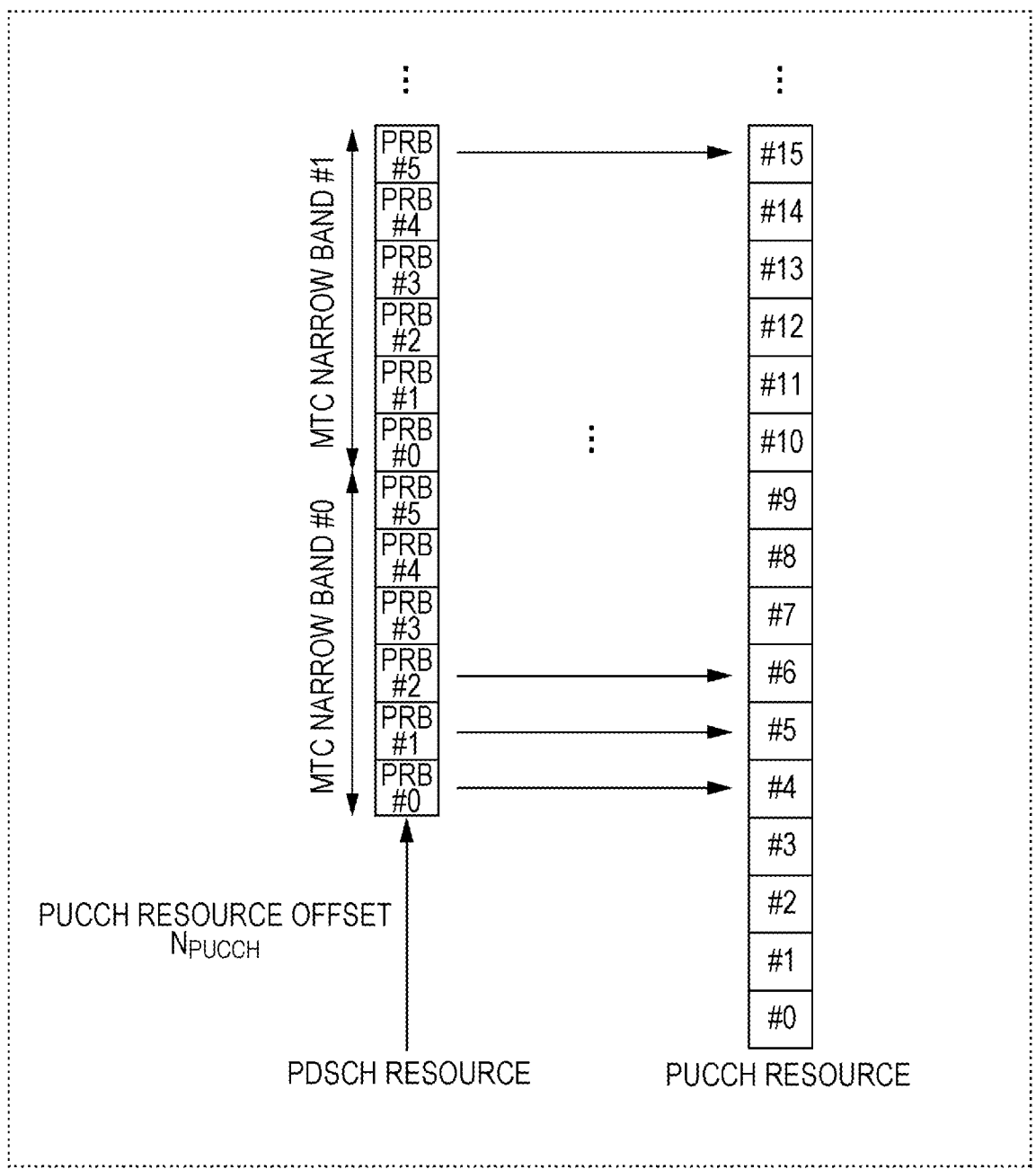
FIG. 13 is a diagram showing an example of association between PRBs and PUCCH resources according to Variation 1 of Embodiment 1.

FIG. 13 shows an example of association between PDSCH resources (PRBs) and PUCCH resources according to Variation 1. In FIG. 13, $N_{PUCCH,MTC}=4$. Further, the MTC narrow band #0 ($n_{NB}=0$) and the MTC narrow band #1 ($n_{NB}=1$) are each individually assigned PRB numbers #0 to #5.

For example, according to Formula (4), a PUCCH resource of $n_{PUCCH,MTC}=4$ (=(0+6·0)+4) is associated with the PRB #0 of the MTC narrow band #0. Similarly, PUCCH resources of $n_{PUCCH,MTC}=5$ to 9 are associated with the PRBs #1 to #5 of the MTC narrow band #0, respectively.

Further, according to Formula (4), a PUCCH resource of $n_{PUCCH,MTC}=10$ (=(0+6·1)+4) is associated with the PRB #0 of the MTC narrow band #1. Similarly, PUCCH resources of $n_{PUCCH,MTC}=11$ to 15 are associated with the PRBs #1 to #5 of the MTC narrow band #1, respectively.

In this way, Variation 1 makes it possible to implicitly identify a PUCCH resource from a PRB number of the PDSCH and an MTC narrow band number and avoid a collision of PUCCH resources associated with PDSCH resources respectively mapped to a plurality of MTC narrow bands.

(Variation 2)

Variation 2 describes a method for allocating PUCCH resources in a case where there are a plurality of MTC narrow bands placed within a system band. The method is different from that of Variation 1.

For example, a description is given by taking, as an example, a case where the base station 100 performs communication with existing LTE terminals in an existing LTE system band (e.g. 20 MHz) and, as shown in FIG. 12, performs communication with two MTC terminals (terminals 200) using two MTC narrow bands (e.g. 1.4 MHz). It should be noted that the number of MTC narrow bands is not limited to 2 but may be 3 or more. Further, each MTC narrow band may be placed in the same position within the system band for each subframe or may be placed in a different position within the system band for each subframe.

For example, in Variation 2, a terminal 200 identifies a PUCCH resource according to the following formula (Math. 5) by using a PUCCH resource offset for each MTC narrow band in addition to a PRB number.

$$n_{PUCCH,MTC} = n_{PRB} + N_{PUCCH,NB(n)} \quad \text{[Math. 5]}$$

Note here that $n_{PUCCH,MTC}$ is the PUCCH resource number of a PUCCH resource that is used for the transmission of an ACK/NACK signal. $n_{PRB}$ denotes the PRB number of a PRB having the smallest index of those of PRBs constituting an MTC narrow band to which the PDSCH is mapped in the last subframe of PDSCH repetition to the MTC terminal. $n_{PRB}$ may take on the same value in each of the plurality of MTC narrow bands.

Further, $N_{PUCCH,NB(n)}$ denotes the PUCCH resource offset value corresponding to the nth MTC narrow band. This PUCCH resource offset value is for example information of which the base station 100 indicates the MTC terminal by using a broadcast signal for MTC (such as MTC SIB).

Figure 14:
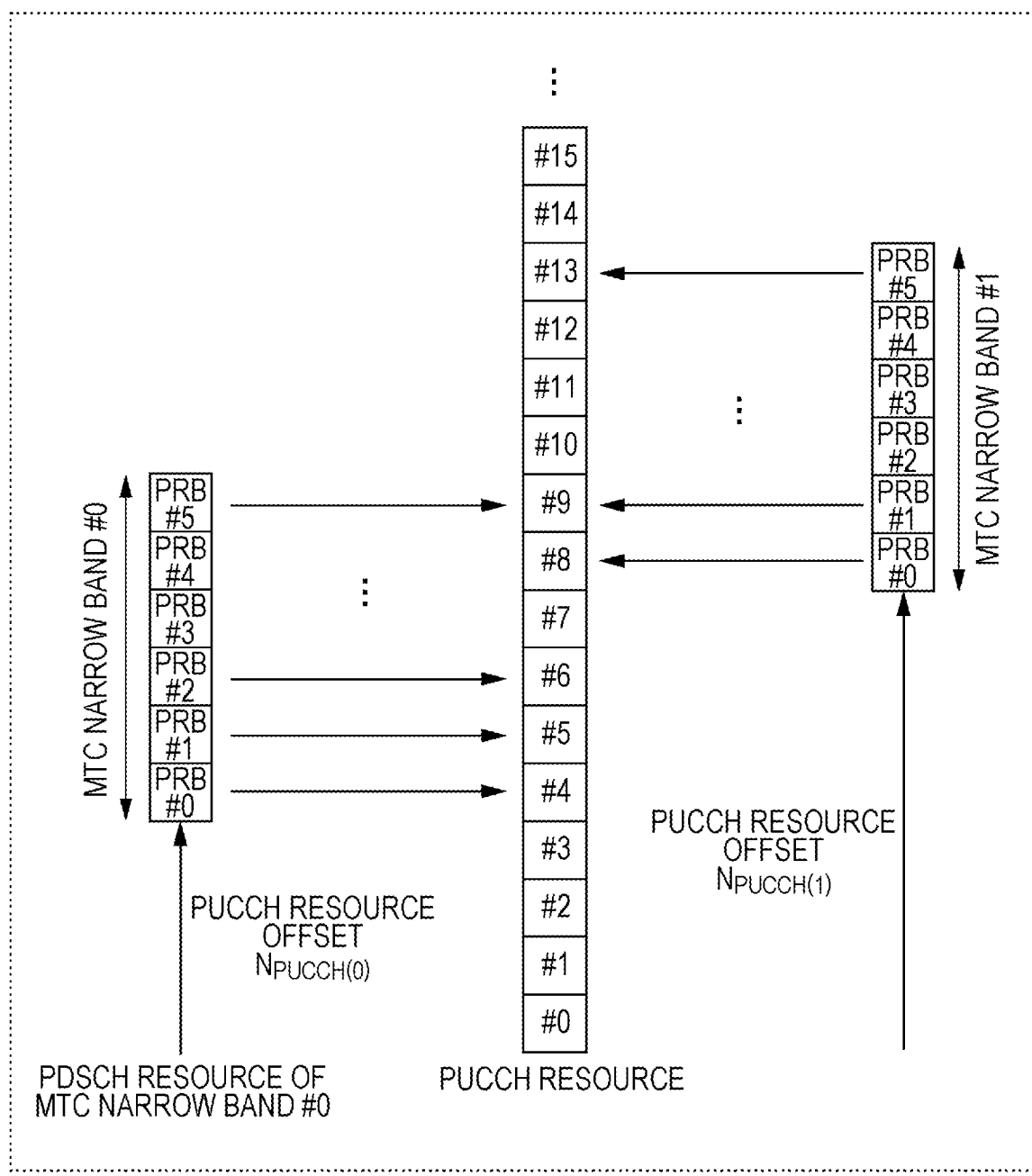
FIG. 14 is a diagram showing an example of association between PRBs and PUCCH resources according to Variation 2 of Embodiment 1.

FIG. 14 shows an example of association between PDSCH resources (PRBs) and PUCCH resources according to Variation 2. In FIG. 14, the PUCCH resource offset value $N_{PUCCH,NB(0)}$, which corresponds to the first (n=1) MTC narrow band, is 4 and the PUCCH resource offset value $N_{PUCCH,NB(1)}$, which corresponds to the second (n=2) MTC narrow band, is 8.

For example, according to (Mathematical Expression 5), a PUCCH resource $n_{PUCCH,MTC}=4$ (=0+4) is associated with the PRB #0 of the MTC narrow band #0. Similarly, PUCCH resources $n_{PUCCH,MTC}=5$ to 9 are associated with the PRBs #1 to #5 of the MTC narrow band #0, respectively.

Further, according to (Mathematical Expression 5), a PUCCH resource $n_{PUCCH,MTC}=8$ (=0+8) is associated with the PRB #0 of the MTC narrow band #1. Similarly, PUCCH resources $n_{PUCCH,MTC}=9$ to 13 are associated with the PRBs #1 to #5 of the MTC narrow band #1, respectively.

In this way, Variation 2 can adjust, for each MTC narrow band, the PUCCH resource offset value corresponding to the MTC narrow band. Further, while it is necessary in Variation 1 that the MTC narrow bands be equal in value of the number of PRBs that constitute each MTC narrow band, it is possible in Variation 2 that the MTC narrow bands may be different in value of the number of PRBs that constitute each MTC narrow band.

It should be noted that while making PUCCH resource offsets take on sufficiently great values makes such operation possible that there is no overlap between PUCCH regions corresponding to a plurality of MTC narrow bands, the total amount of PUCCH resources to be secured increases with the number of MTC narrow bands to be used, with the result that there is an increase in PUCCH overhead. On the contrary, adjusting PUCCH resource offsets makes such operation possible that a plurality of PUCCH regions overlap (see, for example, FIG. 14). In this case, the total amount of PUCCH resources to be secured can be reduced. Note, however, that a collision of PUCCH resources to be used may occur between MTC narrow bands whose PUCCH regions overlap. In a case where such a collision of PUCCH resources occurs, there is deterioration in downlink throughput, as only one of the MTC narrow bands can be allocated. To address this problem, ARO (ACK/NACK resource offset) by which a further offset is indicated may be added into MPDCCH control information as a method for avoiding a collision of PUCCH resources while using a plurality of overlapping PUCCH regions.

Embodiment 2

A base station and terminals according to the present embodiment share common basic components with the base station 100 and the terminals 200 according to Embodiment 1 and, as such, are described with continued reference to FIGS. 7 and 8.

A communication system according to the present embodiment includes one base station 100 and a plurality of terminals 200 (MTC terminals) within a cell.

Let it be assumed that the MTC terminals within the cell are MTC terminals that require an enormous number of repetition transmissions (have high coverage enhancement levels). It should be noted that the MTC terminals support a narrower MTC bandwidth (e.g. 1.4 MHz) than the bandwidth of an existing LTE system.

Note here that in the case of downlink transmission to an MTC terminal having a high coverage enhancement level, the base station 100 may, in order to reduce the required number of repetitions, transmit a control signal or a data signal by using all of the six PRBs within an MTC narrow band.

For this reason, the method for identifying a PUCCH resource associated in one-to-one correspondence with a PRB number cannot make it possible to efficiently use PUCCH resources. For example, in Formula (4) of Embodiment 1, the PUCCH resources #0 to #5 are associated with the PRBs #0 to #5 of the MTC narrow band #0. However, since it is assumed that all of the PRBs #0 to #5 of the MTC narrow band #0 are occupied for one MTC terminal having a high coverage enhancement level, only the PUCCH resource #0 (i.e. the PUCCH resource associated with the smallest PRB #0) is used and the other PUCCH #1 to #5 will not be used.

For the reason noted above, as for MTC terminals that have high coverage enhancement levels (e.g. require a predetermined number of repetitions or more), it is inefficient, from the point of view of resource usage efficiency, to secure PUCCH resources in association with each separate PRB number. Accordingly, as for MTC terminals that have high coverage enhancement levels, the present embodiment secures PUCCH resources in association with each separate MTC narrow band.

For example, in the present embodiment, each of the terminals 200 identifies a PUCCH resource according to the following formula (Math. 6) by using an MTC narrow band number.

$$n_{PUCCH,MTC} = n_{NB} + N_{PUCCH,MTC} \quad \text{[Math. 6]}$$

Note here that $n_{PUCCH,MTC}$ is the PUCCH resource number of a PUCCH resource that is used for the transmission of an ACK/NACK signal. $N_{PUCCH,MTC}$ denotes a PUCCH resource offset value that is commonly given to the MTC terminals within the cell. Further, $n_{NB}$ denotes the number of an MTC narrow band to which the PDSCH is mapped in the last subframe of PDSCH repetition to the terminal.

Figure 15:
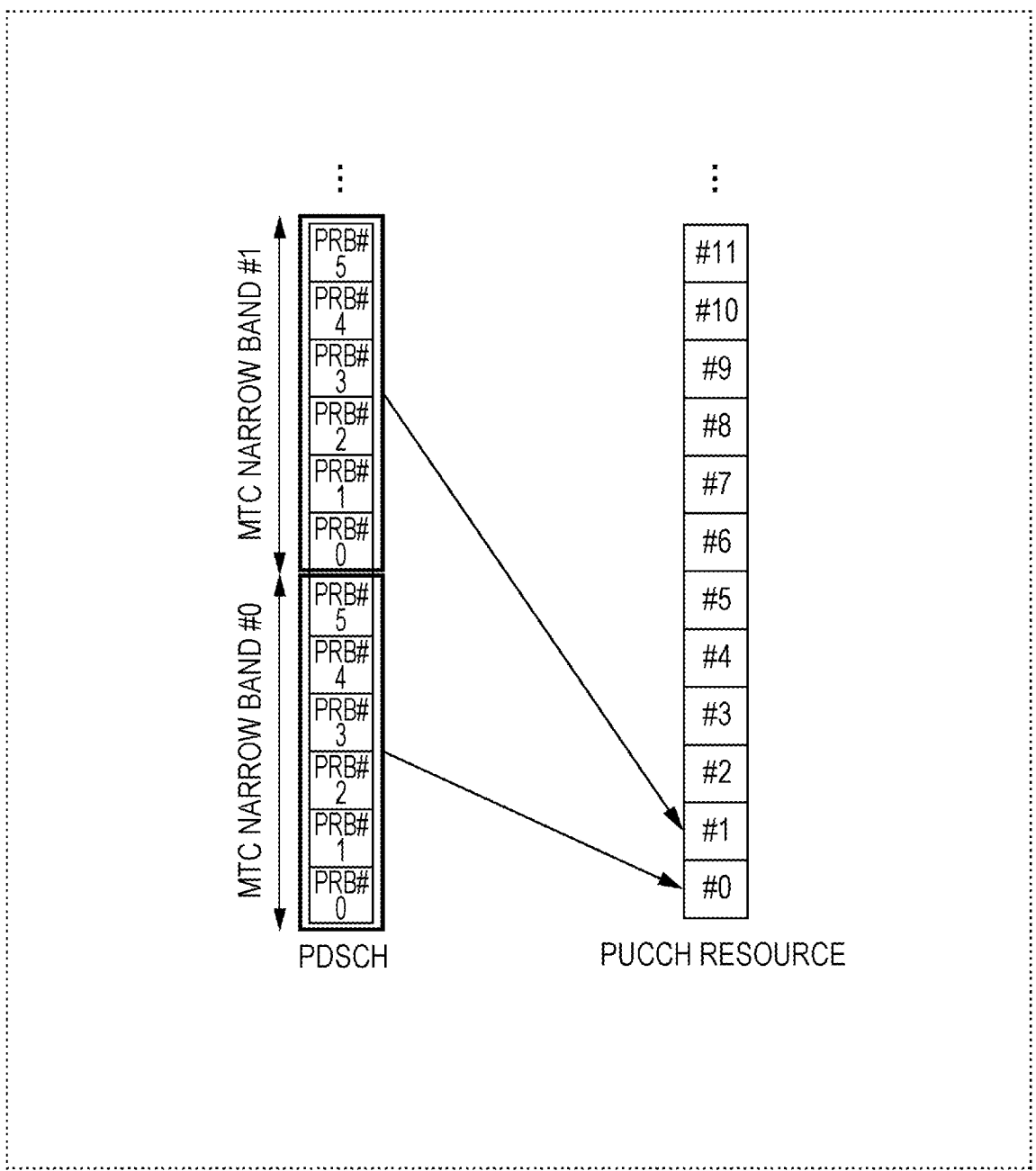
FIG. 15 is a diagram showing an example of association between MTC narrow bands and PUCCH resources according to Embodiment 2.

FIG. 15 shows an example of association between PDSCH resources (PRBs) and PUCCH resources according to the present embodiment. In FIG. 15, $N_{PUCCH,MTC}$=0. Further, the MTC narrow band #0 ($n_{NB}$=0) and the MTC narrow band #1 ($n_{NB}$=1) are each individually assigned PRB numbers #0 to #5.

For example, according to Formula (6), a PUCCH resource of $n_{PUCCH,MTC}$=0 (=0+0) is associated with the MTC narrow band #0, and a PUCCH resource of $n_{PUCCH,MTC}$=1 (=1+0) is associated with the MTC narrow band #1.

As noted above, in the present embodiment, the MTC narrow band number of an MTC narrow band to which the PDSCH is mapped in the last subframe of PDSCH repetition and a PUCCH resource to which an ACK/NACK signal corresponding to the PDSCH is mapped are associated in one-to-one correspondence with each other. Since there is no overlap of MTC narrow bands between a plurality of MTC terminals when the PDSCH corresponding to the PUCCH to be transmitted in the same subframe is mapped to the MTC narrow bands in the last subframes of the PDSCH, there is no overlap of PUCCH resources associated with the MTC narrow bands, either.

With this, the present embodiment, as with Embodiment 1, makes it possible to avoid a collision of PUCCH resources due to a difference in coverage enhancement level or scheduling method (same-subframe scheduling or cross-subframe scheduling) between a plurality of MTC terminals.

Furthermore, the present embodiment makes it possible to efficiently use PUCCH resources by implicitly allocating PUCCH resources on an MTC-narrow-band basis in consideration of the fact that the transmission of the PDSCH to an MTC terminal having a high coverage enhancement level occupies all of the six PRBs within an MTC narrow band.

Further, the PUCCH resource offset value ($N_{PUCCH,MTC}$) according to Formula (6) is information of which the base station 100 indicates an MTC terminal by using a broadcast signal for MTC (such as MTC SIB). Accordingly, the terminal 200 can obtain necessary parameters for the identification of a PUCCH resource prior to an initial connection process, although the terminal 200 cannot demodulate control information allocated to the PDCCH of an existing LTE system. This allows the terminal 200 to also identify a PUCCH resource through which to transmit an ACK/NACK signal as a response to Msg4 that the base station 100 transmits to the terminal 200 through the PDSCH in the course of an initial connection process.

Embodiment 3

A base station and terminals according to the present embodiment share common basic components with the base station 100 and the terminals 200 according to Embodiment 1 and, as such, are described with continued reference to FIGS. 7 and 8.

A communication system according to the present embodiment includes one base station 100 and a plurality of terminals 200 (MTC terminals) within a cell.

Let it be assumed that MTC terminals that have different coverage enhancement levels coexist within the cell. That is, MTC terminals that require no repetition (require no coverage enhancement) or MTC terminals that require only a small number of repetitions (have low coverage enhancement levels) and MTC terminals that require an enormous number of repetition transmissions (have high coverage enhancement levels) coexist within the cell.

Each MTC terminal can satisfy the required quality through the transmission of the number of signals corresponding to the number of repetitions set for the MTC terminal. Therefore, in a case where there is a difference in number of repetitions between MTC terminals, there is a difference in received signal power at the base station between the MTC terminals when seen on a subframe-to-subframe basis. That is, when seen on a subframe-to-subframe basis, the received signal power of an MTC terminal that requires only a small number of repetitions (does not require coverage enhancement or has a low coverage enhancement level) is generally higher than that of an MTC terminal that requires a large number of repetitions (have a high coverage enhancement level).

In a case where there is a great difference in received signal power between MTC terminals, the signal with higher received signal power exerts a greater influence of inter-code interference on the signal with lower received signal power. This makes it difficult to share the same PUCCH resources between an MTC terminal that requires no coverage enhancement or has a low coverage enhancement level and an MTC terminal that has a high coverage enhancement level.

To address this problem, the present embodiment associates different PUCCH regions (PUCCH resources) with a PDSCH resource that is used by an MTC terminal that requires no coverage enhancement or has a low coverage enhancement level and a PDSCH resource that is used by an MTC terminal that has a high coverage enhancement level, respectively. In other words, an MTC terminal for which less than a predetermined number of subframes are used to transmit the PDSCH and an MTC terminal for which the predetermined number of subframes or more are used to transmit the PDSCH use different regions of the PUCCH resource to transmit the ACK/NACK signal.

This eliminates the need to take into account a collision of PUCCH resources between an MTC terminal that requires no coverage enhancement or has a low coverage enhancement level and an MTC terminal that has a high coverage enhancement level. This makes it possible to apply an optimum PUCCH resource identification method to each MTC terminal.

Further, the base station 100 can allocate each individual one of the six PRBs within an MTC narrow band to the PDSCH directed to a plurality of MTC terminals that require no coverage enhancement or have low coverage enhancement levels. For this reason, as described in Embodiment 1, the method for securing PUCCH resources in association with each separate PRB number is suitable to MTC terminals that require no coverage enhancement or have low coverage enhancement levels (i.e. MTC terminals that require less than a predetermined number of repetitions). That is, a PRB number of an MTC narrow band to which a PDSCH is mapped in the last subframe of PDSCH repetition and a PUCCH resource to which an ACK/NACK signal corresponding to the PDSCH is mapped are associated in one-to-one correspondence with each other.

Meanwhile, the base station 100 allocates all of the six PRBs within an MTC narrow band to each PDSCH directed to an MTC terminal that has a high coverage enhancement level, and transmits the PDSCH. For this reason, as described in Embodiment 2, the method for securing PUCCH resources in association with each separate MTC narrow band is suitable to MTC terminals that have high coverage enhancement levels (i.e. MTC terminals that require a predetermined number of repetitions or more). That is, the MTC narrow band number of an MTC narrow band to which a PDSCH is mapped in the last subframe of PDSCH repetition and a PUCCH resource to which an ACK/NACK signal corresponding to the PDSCH is mapped are associated in one-to-one correspondence with each other.

As noted above, the present embodiment secures different PUCCH resources (that do not overlap each other) for an MTC terminal that requires no coverage enhancement or has a low coverage enhancement level and a MTC terminal that has a high coverage enhancement level, respectively, and applies the association between PDSCH resources and PUCCH resources that is suitable to the coverage enhancement level of each MTC terminal (the association on a PRB basis or an MTC-narrow-band basis).

With this, the present embodiment makes it possible to reduce the influence of inter-code interference attributed to a difference in received signal power between MTC terminals due to a difference in coverage enhancement level. Further, the present embodiment, as with Embodiment 2, makes it possible to efficiently use PUCCH resources according to the coverage enhancement level.

The foregoing has described each embodiment of the present disclosure.

It should be noted that the foregoing embodiments have described a method for identifying a PUCCH resource through which to transmit an ACK/NACK signal as a response to the PDSCH (downlink data). Meanwhile, the foregoing embodiments may be applied to a method for identifying a PUCCH resource through which to transmit an ACK/NACK signal as a response to the MPDCCH having given an instruction to release SPS (semi-persistent scheduling) (end SPS). In this case, similar effects can be brought about by replacing the PDSCH with the MPDCCH in the foregoing embodiments.

Further, in the foregoing embodiments, the terminal may succeed in decoding before receiving all repetition signals that the base station transmitted through the PDSCH. In this case, the terminal may, in order to reduce power consumption, not receive the remaining repetition signals. Meanwhile, the base station cannot find at what point in time of the repetition signals the terminal successfully decoded the PDSCH. For this reason, use of a PUCCH resource associated with a PDSCH resource in the last subframe of a repetition signal that the terminal received may cause an ACK/NACK signal to be transmitted through a PUCCH resource that is different from a PUCCH resource through which the base station supposes it is transmitted. To address this problem, even in a case where the terminal succeeds in decoding before receiving all repetition signals that the base station transmitted through the PDSCH and, in order to reduce power consumption, does not receive the remaining repetition signals, the terminal transmits an ACK/NACK signal through a PUCCH resource associated with a PDSCH resource in the last subframe of a repetition signal that the terminal was supposed to receive. The terminal can find, from the control information contained in the MPDCCH or the predetermined settings, the PDSCH resource in the last subframe of the repetition signal that the terminal was supposed to receive. This allows the terminal and the base station to transmit and receive an ACK/NACK signal by identifying the same PUCCH resource even in a case where the terminal does not receive the remaining repetition signals.

Further, while each embodiment has been described above by taking, as an example, a case where an aspect of the present disclosure is configured by hardware, the present disclosure can also be realized by software in cooperation with hardware.

Further, each functional block used in the description of each embodiment described above can be typically realized by an LSI such as an integrated circuit. Further, the integrated circuit may control each functional block used in the description of each embodiment described above and include an input and an output coupled thereto. These LSIs may be individually formed as one chip, or one chip may be formed so as to include a part or all of the functional blocks. The LSI here may be referred to as an IC (integrated circuit), a system LSI, a super LSI, or an ultra LSI depending on a difference in the degree of integration.

However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

A terminal of the present disclosure is configured to include: a receiver that receives the same downlink data over one or more subframes through a downlink resource within a narrow band for MTC terminal; a generator that generates a response signal as a response to the downlink data; and a transmitter that transmits the response signal through an uplink resource a predetermined number of subframes after the last subframe of the one or more subframes, the uplink resource being associated in one-to-one correspondence with the number of a downlink resource to which the downlink data is allocated in the last subframe.

In the terminal of the present disclosure, the number of the downlink resource is the number of a PRB (physical resource block) that constitutes the narrow band.

In the terminal of the present disclosure, the number of the downlink resource is the number of the narrow band.

In the terminal of the present disclosure, a first MTC terminal for which less than a predetermined number of subframes are used to transmit the downlink data and a second MTC terminal for which the predetermined number of subframes or more is used to transmit the downlink data use different regions of the uplink resource to transmit the response signal.

In the terminal of the present disclosure, the number of the downlink resource associated in one-to-one correspondence with the uplink resource in the region of the uplink resource used by the first MTC terminal is the number of a PRB (physical resource block) that constitutes the narrow band, and the number of the downlink resource associated in one-to-one correspondence with the uplink resource in the region of the uplink resource used by the second MTC terminal is the number of the narrow band.

A base station of the present disclosure is configured to include: a transmitter that transmits the same downlink data over one or more subframes through a downlink resource within a narrow band for MTC terminal; and a receiver that receives a response signal as a response to the downlink data through an uplink resource a predetermined number of subframes after the last subframe of the one or more subframes, the uplink resource being associated in one-to-one correspondence with the number of a downlink resource to which the downlink data is allocated in the last subframe.

A transmission method of the present disclosure includes: receiving the same downlink data over one or more subframes through a downlink resource within a narrow band for MTC terminal; generating a response signal as a response to the downlink data; and transmitting the response signal through an uplink resource a predetermined number of subframes after the last subframe of the one or more subframes, the uplink resource being associated in one-to-one correspondence with the number of a downlink resource to which the downlink data is allocated in the last subframe.

A reception method of the present disclosure includes: transmitting the same downlink data over one or more subframes through a downlink resource within a narrow band for MTC terminal; and receiving a response signal as a response to the downlink data through an uplink resource a predetermined number of subframes after the last subframe of the one or more subframes, the uplink resource being associated in one-to-one correspondence with the number of a downlink resource to which the downlink data is allocated in the last subframe.

INDUSTRIAL APPLICABILITY

An aspect of the present disclosure is useful in a mobile communication system.

REFERENCE SIGNS LIST

100 Base station
200 Terminal
101, 209 Controller
102 Control signal generator
103 Control signal coder
104 Control signal modulator
105 Data coder
106 Retransmission controller
107 Data modulator
108, 214 Signal allocator
109, 215 IFFT unit
110, 216 CP appender
111, 217 Transmitter
112, 201 Antenna
113, 202 Receiver
114, 203 CP eliminator
115 PUCCH extractor
116 Synthesizer
117 Demapping unit
118 Channel estimator
119 Equalizer
120 De-spreader
121 Correlation processor
122 Determiner
204 FFT unit
205 Extractor
206 Data demodulator
207 Data decoder
208 CRC unit
210 Response signal generator
211 Modulator
212 Spreader
213 Repetition unit

The invention claimed is:

1. A terminal comprising:
a receiver which, in operation, receives the same downlink data in one or more subframes through a downlink resource within a machine-type communication (MTC) narrow band;
circuitry which, in operation, generates a response signal as a response to the downlink data; and
a transmitter which, in operation, transmits the response signal through an uplink resource a predetermined number of subframes after a last subframe of the one or more subframes, the uplink resource being associated in one-to-one correspondence with a number of a downlink resource to which the downlink data is allocated in the last subframe,
wherein a resource number of the uplink resource through which the response signal is transmitted is equal to a predetermined resource offset value plus a number of a resource having a smallest index among one or more resources that constitute the MTC narrow band.

2. The terminal according to claim 1, wherein the number of the downlink resource is a number of a physical resource block (PRB) that constitutes the narrow band.

3. The terminal according to claim 1, wherein the number of the downlink resource is a number that identifies the narrow band.

4. The terminal according to claim 1, wherein the uplink resource through which the response signal is transmitted includes different regions that are used by a first MTC terminal for which less than a predetermined number of subframes are used to transmit the downlink data and a second MTC terminal for which the predetermined number of subframes or more is used to transmit the downlink data.

5. The terminal according to claim 4, wherein the number of the downlink resource associated in one-to-one correspondence with the uplink resource in the region of the uplink resource used by the first MTC terminal is the number of a physical resource block (PRB) that constitutes the narrow band, and
the number of the downlink resource associated in one-to-one correspondence with the uplink resource in the region of the uplink resource used by the second MTC terminal is a number of the narrow band.

6. A base station comprising:
a transmitter which, in operation, transmits the same downlink data over one or more subframes through a downlink resource within a machine-type communication (MTC) narrow band; and
a receiver which, in operation, receives a response signal as a response to the downlink data through an uplink resource a predetermined number of subframes after a last subframe of the one or more subframes, the uplink resource being associated in one-to-one correspondence with a number of a downlink resource to which the downlink data is allocated in the last subframe,
wherein a resource number of the uplink resource through which the response signal is received is equal to a predetermined resource offset value plus a number of a resource having a smallest index among one or more resources that constitute the MTC narrow band.

7. A transmission method comprising:
receiving the same downlink data over one or more subframes through a downlink resource within a machine-type communication (MTC) narrow band;
generating a response signal as a response to the downlink data; and
transmitting the response signal through an uplink resource a predetermined number of subframes after a last subframe of the one or more subframes, the uplink resource being associated in one-to-one correspondence with a number of a downlink resource to which the downlink data is allocated in the last subframe,
wherein a resource number of the uplink resource through which the response signal is transmitted is equal to a predetermined resource offset value plus a number of a resource having a smallest index among one or more resources that constitute the MTC narrow band.

* * * * *